(12) United States Patent
Drako et al.

(10) Patent No.: US 10,341,684 B2
(45) Date of Patent: Jul. 2, 2019

(54) HIGH DEFINITION SURVEILLANCE IMAGE STORAGE OPTIMIZATION APPARATUS AND METHODS OF RETENTION TRIGGERING

(71) Applicants: Dean Drako, Austin, TX (US); Steven Roskowski, Los Gatos, CA (US)

(72) Inventors: Dean Drako, Austin, TX (US); Steven Roskowski, Los Gatos, CA (US)

(73) Assignee: Eagle Eye Networks, Inc., Austin, TX (US)

( * ) Notice: Subject to any disclaimer, the term of this patent is extended or adjusted under 35 U.S.C. 154(b) by 456 days.

(21) Appl. No.: 15/338,507

(22) Filed: Oct. 31, 2016

(65) Prior Publication Data

US 2017/0048482 A1 Feb. 16, 2017

Related U.S. Application Data

(63) Continuation-in-part of application No. 15/338,327, filed on Oct. 29, 2016, which is a continuation-in-part
(Continued)

(51) Int. Cl.
*H04N 19/00* (2014.01)
*H04N 19/625* (2014.01)
(Continued)

(52) U.S. Cl.
CPC ............ *H04N 19/625* (2014.11); *H04N 5/77* (2013.01); *H04N 5/781* (2013.01); *H04N 7/181* (2013.01);
(Continued)

(58) Field of Classification Search
CPC ............... H04N 19/91; H04N 5/915; H04N 7/18–7/188; H04N 19/00–19/625;
(Continued)

(56) References Cited

U.S. PATENT DOCUMENTS 5,689,442 A * 11/1997 Swanson .......... G08B 13/19647
340/500
10,186,124 B1 * 1/2019 Mullins ............ G08B 13/19615
(Continued)

*Primary Examiner* — Sean T Motsinger
(74) *Attorney, Agent, or Firm* — Patentry; Peter G. H. Hwang

(57) ABSTRACT

A high definition surveillance video storage optimization system executes purging directives according to policy and retention meta data. Segments of video are purged from storage when thresholds of retention metrics are applied and when policy permits. Retention metrics are determined from acoustic sound energy, radiation energy, access control events, and movement. Policies reflect calendars and elapsed time, percentage of available storage, statutory and judicial mandates, and utility of the stored segments. Extrinsic sensor data and operations are recorded into non-transitory retention meta data stores. Metrics are transformed into retention flags at either time of recordation or time of purgation. Security file storage includes metadata about the environment acquired by sensors include doors, audio noise, object identification and tracking and inputs which influence retention or purging. A circuit filters for motion and stores metadata per segment. Meta data enables content based purging of least consequential files.

11 Claims, 14 Drawing Sheets

Related U.S. Application Data of application No. 14/479,349, filed on Sep. 7, 2014, now Pat. No. 9,648,355.

(60) Provisional application No. 61/949,526, filed on Mar. 7, 2014.

(51) Int. Cl.

| | | |
|---|---|---|
| *H04N 7/18* | (2006.01) | |
| *H04N 19/48* | (2014.01) | |
| *H04N 5/77* | (2006.01) | |
| *H04N 5/781* | (2006.01) | |
| *H04N 9/804* | (2006.01) | |
| *H04N 9/82* | (2006.01) | |
| *H04N 19/176* | (2014.01) | |
| *H04N 19/61* | (2014.01) | |
| *H04N 19/117* | (2014.01) | |
| *H04N 19/91* | (2014.01) | |
| *H04N 19/132* | (2014.01) | |
| *H04N 19/137* | (2014.01) | |
| *H04N 21/2187* | (2011.01) | |
| *H04N 21/4335* | (2011.01) | |
| *H04N 21/44* | (2011.01) | |
| *H04N 21/84* | (2011.01) | |

(52) U.S. Cl.
CPC ......... *H04N 9/8042* (2013.01); *H04N 9/8205* (2013.01); *H04N 19/117* (2014.11); *H04N 19/132* (2014.11); *H04N 19/137* (2014.11); *H04N 19/176* (2014.11); *H04N 19/48* (2014.11); *H04N 19/61* (2014.11); *H04N 19/91* (2014.11); *H04N 21/2187* (2013.01); *H04N 21/4335* (2013.01); *H04N 21/44008* (2013.01); *H04N 21/84* (2013.01)

(58) Field of Classification Search
CPC ........ H04N 5/781; H04N 5/77; H04N 9/8205; H04N 9/8042; H04N 21/2187; H04N 21/4335; H04N 21/44008; H04N 21/84
See application file for complete search history.

(56) References Cited

U.S. PATENT DOCUMENTS

| | | | |
|---|---|---|---|
| 2005/0243171 A1* | 11/2005 | Ross, Sr. | B60R 25/302 348/148 |
| 2005/0271251 A1* | 12/2005 | Russell | G06K 9/00288 382/103 |
| 2006/0239645 A1* | 10/2006 | Curtner | G08B 13/19606 386/228 |
| 2007/0103541 A1* | 5/2007 | Carter | H04N 7/142 348/14.06 |
| 2007/0103548 A1* | 5/2007 | Carter | H04M 11/025 348/143 |
| 2008/0036593 A1* | 2/2008 | Rose-Pehrsson | G08B 17/00 340/540 |
| 2009/0219392 A1* | 9/2009 | Roskowski | H04L 1/1685 348/143 |
| 2010/0045791 A1* | 2/2010 | Drive | G08B 13/19693 348/143 |
| 2010/0208064 A1* | 8/2010 | Liu | G08B 13/19667 348/143 |
| 2010/0245583 A1* | 9/2010 | Harel | G08B 13/19656 348/159 |
| 2011/0025846 A1* | 2/2011 | Garrett | H04N 7/18 348/143 |
| 2012/0014659 A1* | 1/2012 | Hugosson | G08B 13/19669 386/228 |
| 2013/0222587 A1* | 8/2013 | Roskowski | H04L 67/2895 348/143 |
| 2013/0321623 A1* | 12/2013 | Roskowski | H04N 7/18 348/143 |
| 2014/0198216 A1* | 7/2014 | Zhai | H04N 7/181 348/159 |
| 2014/0232874 A1* | 8/2014 | Meyer | H04N 7/181 348/159 |
| 2015/0131964 A1* | 5/2015 | Liu | G08B 13/19665 386/226 |
| 2016/0309121 A1* | 10/2016 | Chan | G06F 16/7867 |
| 2017/0048482 A1* | 2/2017 | Drako | H04N 7/181 |
| 2017/0048556 A1* | 2/2017 | Drako | H04N 7/188 |
| 2017/0053488 A1* | 2/2017 | Takeda | G07F 17/3239 |
| 2017/0054571 A1* | 2/2017 | Kitchen | H04L 12/2818 |
| 2017/0200476 A1* | 7/2017 | Chen | G06F 16/21 |
| 2018/0113577 A1* | 4/2018 | Burns | G06F 16/739 |
| 2018/0115788 A1* | 4/2018 | Burns | G06K 9/00718 |

* cited by examiner

HIGH DEFINITION SURVEILLANCE IMAGE STORAGE OPTIMIZATION APPARATUS AND METHODS OF RETENTION TRIGGERING

CROSS-REFERENCES TO RELATED APPLICATIONS

This non-provisional application is a continuation in part application of Ser. No. 15/338,327 filed 29 Oct. 2016 Content-driven surveillance image storage optimization apparatus and method of operation which is incorporated by reference in its entirety and claims the benefit of provisional application 61/949,526 and its priority date Mar. 7, 2014

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

As is known, digital cameras record, store, and transmit images in several industry standard formats, such as H.234 and JPEG. The field of the invention is in the field of image analysis, and storage optimization. The invention improves the operation of video retention equipment.

Conventional file archive storage systems conserve space by time based purging of files by date of recording or by removing the larger files which have not been used in recent time. Thus it can be appreciated that what is needed is an improved system to more analytically selectably delete only by content or meta data after an adjustable time period of days the video that does not provide significant content to save storage space. In some cases, inactivity at a time and one or more locations is significant. Triggering retention on motion alone may be an error.

Security Cameras

As is known, High Definition (HD) cameras used for security surveillance (SECCAMs) can produce high resolution and low resolution digital files across a wide spectrum both visible and invisible to the human eye. The files may be of static images or moving images. The cameras may auto focus and auto adjust for lighting. The cameras may store data or push it to network attached servers. Many SEC-CAMs do not pan or zoom and always present the same view. Some SECCAMs take a still image when triggered by a sensor, a timer, or an event. As is known, conventional SECCAMs have hardware circuits to produce H.264 compatible video for high definition files.

As is known H.264 encoders vary the bit rate to dedicate more bits to the frames that need them. Inter coding uses motion vectors for block-based inter prediction to exploit temporal statistical dependencies between different pictures. Intra coding uses various spatial prediction modes to exploit spatial statistical dependencies in the source signal for a single picture. Motion vectors and intra prediction modes may be specified for a variety of block sizes in the picture. A motion vector is defined as "motion vector: A two-dimensional vector used for inter prediction that provides an offset from the coordinates in the decoded picture to the coordinates in a reference picture."

As is known, H.264 pictures include I frames, B frames and P frames. Pixel blocks of the I frames are referenced by P frames along with Motion Vectors. Motion vectors are encoded at the macroblock level in P or B frames. Motion vectors are encoded differentially relative to previous motion vectors encoded in the frame. Furthermore, the syntax and scale of the motion vectors depends on information that is included in the picture header and picture coding extension header. After a macroblock has been decoded, the motion vector decoder can be queried in order to get the current value of any motion vector. This information is no longer available once the next macroblock is decoded because it is replaced by whatever motion vector information is associated with the next macroblock instead. To capture motion vectors, you need to collect them from the motion vector decoder after each macroblock is decoded.

JPEG

As is known, the name "JPEG" stands for joint Photographic Experts Group, the name of the committee that created the JPEG standard and also other still picture coding standards.

The JPEG standard specifies the codec (code decode transform), which defines how an image is compressed into a stream of bytes and decompressed back into an image, but not the file format used to contain that stream.

JPEG uses a lossy form of compression based on the discrete cosine transform (DCT). This mathematical operation converts each frame/field of the video source from the spatial (2D) domain into the frequency domain (aka transform domain.) A perceptual model based loosely on the human psychovisual system discards high-frequency information, i.e. sharp transitions in intensity, and color hue. In the transform domain, the process of reducing information is called quantization. In simpler terms, quantization is a method for optimally reducing a large number scale (with different occurrences of each number) into a smaller one, and the transform-domain is a convenient representation of the image because the high-frequency coefficients, which contribute less to the over picture than other coefficients, are characteristically small-values with high compressibility. The quantized coefficients are then sequenced and losslessly packed into the output bitstream. Nearly all software implementations of JPEG permit user control over the compression-ratio (as well as other optional parameters), allowing the user to trade off picture-quality for smaller file size.

JPEG File Interchange Format (JFIF) is a minimal file format which enables JPEG bitstreams to be exchanged between a wide variety of platforms and applications. This minimal format does not include any of the advanced features found in the TIFF JPEG specification or any application specific file format. Nor should it, for the only purpose of this simplified format is to allow the exchange of JPEG compressed images.

JPEG Codec Example

Although a JPEG file can be encoded in various ways, most commonly it is done with JFIF encoding. The encoding process consists of several steps:
1. The representation of the colors in the image is converted from RGB to Y'CBCR, consisting of one luma component (Y'), representing brightness, and two chroma components, (CB and CR), representing color. This step is sometimes skipped. 2. The resolution of the chroma data is reduced, usually by a factor of 2. This reflects the fact that the eye is less sensitive to fine color details than to fine brightness details. 3. The image is split into blocks of 8.times.8 pixels, and for each block, each of the Y, CB, and CR data undergoes the Discrete Cosine Transform (DCT. A DCT is similar to a Fourier transform in the sense that it produces a kind of spatial frequency spectrum. 4. The amplitudes of the frequency components are quantized. Human vision is much more sensitive to small variations in color or brightness over large areas than to the strength of high-frequency brightness variations. Therefore, the magnitudes of the high-frequency components are stored with a lower accuracy than the low-frequency components. 5. The resulting data for all 8.times.8 blocks is further compressed with a lossless algorithm, a variant of Huffman encoding. 6. The decoding process reverses these steps, except the quantization because it is irreversible.

DCT

As is known, the discrete cosine transform (DCT) expresses a finite sequence of data points in terms of a sum of cosine functions oscillating at different frequencies. DCTs are important to numerous applications in science and engineering, from lossy compression of audio (e.g. MP3) and images (e.g. JPEG) (where small high-frequency components can be discarded), to spectral methods for the numerical solution of partial differential equations. The use of cosine rather than sine functions is critical in these applications: for compression, it turns out that cosine functions are much more efficient (fewer functions are needed to approximate a typical signal), whereas for differential equations the cosines express a particular choice of boundary conditions.

In particular, a DCT is a Fourier-related transform similar to the discrete Fourier transform (DFT), but using only real numbers. DCTs are equivalent to DFTs of roughly twice the length, operating on real data with even symmetry (since the Fourier transform of a real and even function is real and even), where in some variants the input and/or output data are shifted by half a sample. There are eight standard DCT variants, of which four are common.

The most common variant of discrete cosine transform is the type-II DCT, which is often called simply "the DCT", its inverse, the type-III DCT, is correspondingly often called simply "the inverse DCT" or "the IDCT".

The compression method is usually lossy, meaning that some original image information is lost and cannot be restored, possibly affecting image quality.

Like any Fourier-related transform, discrete cosine transforms (DCTs) express a function or a signal in terms of a sum of sinusoids with different frequencies and amplitudes. Like the discrete Fourier transform (DFT), a DCT operates on a function at a finite number of discrete data points. The obvious distinction between a DCT and a DFT is that the former uses only cosine functions, while the latter uses both cosines and sines (in the form of complex exponentials).

Huffman Encoding/Decoding

As is known, Huffman coding is an entropy encoding algorithm used for lossless data compression. The term refers to the use of a variable-length code table for encoding a source symbol (such as a character in a file) where the variable-length code table has been derived in a particular way based on the estimated probability of occurrence for each possible value of the source symbol.

Huffman coding uses a specific method for choosing the representation for each symbol, resulting in a prefix code that expresses the most common source symbols using shorter strings of bits than are used for less common source symbols. Huffman was able to design the most efficient compression method of this type: no other mapping of individual source symbols to unique strings of bits will produce a smaller average output size when the actual symbol frequencies agree with those used to create the code.

For a set of symbols with a uniform probability distribution and a number of members which is a power of two, Huffman coding is equivalent to simple binary block encoding, e.g., ASCII coding. Huffman coding is such a widespread method for creating prefix codes that the term "Huffman code" is widely used as a synonym for "prefix code" even when such a code is not produced by Huffman's algorithm.

Security Cameras

As is known, cameras used for security surveillance (SECCAMs) can produce high resolution and low resolution digital files. The files may be of static images or moving images. The cameras may auto focus and auto adjust for lighting. The cameras may store data or push it to network attached servers. Many SECCAMs do not pan or zoom and always present the same view. Some SECCAMs take a still image when triggered by a sensor, a timer, or an event. As is known, conventional SECCAMs have hardware circuits to produce H.264 compatible video for high definition as well as JPEG compatible encoded files. As is known, both software and hardware products to generate a stream of JPEG images from H.264 video are commercially offered.

One problem with conventional SECCAMs installed with onsite storage is that the data may be lost or stolen in the same incident for which the images would have been useful. SECCAMs may provide timestamps at the camera to record events for later viewing. In many cases, there is no attendant to monitor SECCAMs in real time. Thus economical remote storage and delayed analysis are advantageous if the useful images could be transported without congesting a low bandwidth network. A requirement is that allocated bandwidth schedules not be exceeded. Within this patent application we refer to JPEG compatible image files originating or derived from SECCAMs as "previews" or "frames".

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

SUMMARY OF THE INVENTION

Figure 1:
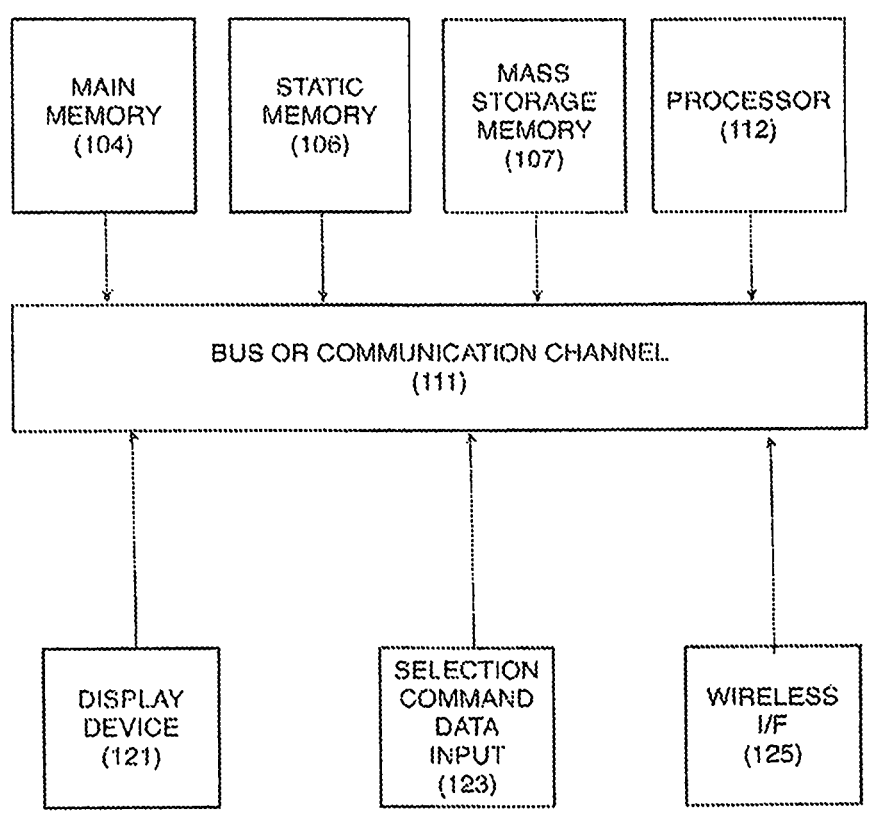
FIG. 1 is a block diagram of a conventional processor used for performing method steps in an apparatus.

A high definition (HD) surveillance video storage optimization system executes purging directives according to policy and retention meta data. Segments of video are purged from storage when thresholds of retention metrics are applied and when policy permits.

Retention metrics are determined from acoustic sound energy, radiation energy, access control events, and movement. Measures of acoustic sound energy are extracted from a HD recording or from sensors installed at the surveillance location. Loud voices, impact sounds, sirens, and alarms may trigger setting a retention flag. Radiation energy may be visible or non-visible spectrum extracted from a HD recording or infrared security sensors. Heat and temperature sensors may provide retention flags or metrics. Chemical sensors increase or decrease conductivity through chamber. Accelerometers measure shaking, vibration, and physical movement.

Policies reflect calendars and elapsed time, percentage of available storage, statutory and judicial mandates, and utility of the stored segments. Extrinsic sensor data and operations are recorded into non-transitory retention meta data stores.

Metrics derived from the high definition video stream itself are stored into files and file headers for a future purging process. Movement vectors of H.264 blocks and low frequency coefficients of pixel blocks are compared with a threshold to determine availability for purging.

Metrics are transformed into retention flags at either time of recordation or time of purgation A storage system can either do motion analysis at purge time or when the video is initially archived. It is better if the motion analysis is done during the initial recording because the video can be pre-broken into segments that contain motion and other segments that do not contain motion prior to being saved to storage. This would make it easier to delete the portions that do not contain motion at a time when free storage is needed. Other analytic information could be added to the input to this purge selection mechanism. Door opening and closing information could be used to determine to keep video. Security file storage may include metadata about the environment acquired by sensors as well. Ambient audio noise can be used to keep video as well.

Object identification and tracking could be used to keep the video as well. Any number of video or external inputs could be used to decide to keep the video. A content-driven purging circuit removes image segments from a surveillance image store according to purging directives in combination with retention meta data. An image transformation circuit provides retention meta data based on movement metrics. The circuit decodes and differences low frequency coefficients of corresponding pixel blocks in two image frames. Additionally, extrinsic measurements and rules are embedded in directives and a retention meta data store.

A lossy compression method optimizes bandwidth and storage for a security surveillance network of appliances and event capture terminals. The method is performed by a processor upon an image file (Jframe) provided by a JPEG compatible encoder. The processor is adapted by computer readable instructions stored in non-transitory media to perform operations on Jframes in both the time domain and in the frequency domain simultaneously which cannot be done mentally or by hand. Because the objective is security surveillance, the viewpoint of an event capture terminal neither pans nor zooms.

A method transforms a sequential plurality of Jframes into a train composed of a key frame (Kframe) and one or more subsequent frames (subframes). Each block of pixels in a key frame has coefficients in a plurality of frequency bins. Each corresponding block of pixels in a subsequent frame may contain the difference in coefficients between its source Jframe and its Kframe. One or more subsequent frames follow a key frame and are compressed relative to their untransformed Jframe by containing delta coefficients in the frequency domain. The resulting set of delta coefficients are re-encoded using a Huffman encoder.

Decompression combines a subsequent frame with its key frame to provide an image with graduated resolution/noise clutter. While viewing a subsequent frame on its own is possible with a JPEG compatible browser or display it would seem to be meaningless without its reference key frame. Reversing the transformation requires recovering all the frequency coefficients of the key frame and the subframe and adding each delta coefficient to its corresponding Kframe coefficient. But the invention further optimizes compression by removing thermal and visual noise and sacrificing resolution in some of the pixel blocks. The method further includes how to select pixel blocks and how to remove noise or sacrifice resolution.

A camera records, encodes, stores, and forwards a plurality of image files, each file compatible with JPEG standard encoders/decoders (codecs). In addition to motion video or high definition or 3D or analog signals, conventional cameras default to always providing a series of still images in digital format encoded by the JPEG standard. These are frequency domain coefficients for blocks of pixels further encoded by a Huffman codec. A local area network such as Ethernet or Wi-Fi couples the camera with an appliance of the present disclosure.

Periodically or upon conditions in the content or external events, key frames are selected from among the plurality of image files. The apparatus may trigger on external events (e.g. sensors), image contents (e.g. motion, facial recognition), or internal processes such as periodicity (e.g. timer, counter), or data stored (e.g. buffer capacity) to select a Jframe to serve as a key frame. The characteristics of one key frame may influence the selection of a next key frame. The size of a key frame may influence the target size of its subsequent frames and the configuration of a low pass filter.

Meta data is stored separately or within the file headers of key frames and subsequent frames to enable decompression of a single subsequent frame. Meta data includes but is not limited to identification of key frames and their locations (relative or absolute), the key frame each subsequent frame references, the size of files and the target size or target compression ratio, time and location, camera identity, and the low pass filter configuration.

The transformation operates on coefficients of frequency bins. One aspect of the invention is to mask high frequency bins to achieve target size or compression ratios. Another aspect of the invention is to mask high frequency bins to remove thermal noise, lighting figments, and background vibration. Another aspect of the invention is to selectively improve resolution of selected pixel blocks for pertinent security surveillance objectives.

A first frame in a stream of JPEG image frames is designated a first key frame and stored. Each frame subsequent to the first key frame is transformed into a delta frame containing the differences from the first key frame. A second frame is designated a second key frame when the magnitudes of the differences cause the effective compression of the most recent transformed subsequent frame to fall below a threshold.

Data compression is obtained by only storing into non-transitory media and transmitting over a network the differences between a non-baseline frame and its baseline predecessor. Taking advantage of the nature of security cameras, there is high potential for successful compression. Many images taken are the same as the previous image. Even if an image has something new, most of the image is background or foreground, which has not changed. Security cameras are generally fixed and do not pan, zoom, or change in attitude. Lighting due to time of day will change and persons or vehicles will enter, leave, or transit from one edge to another.

A new baseline is selected below a target. Typically, the first frame after a key frame has the least change and provides the best possible compression. The size of the difference files will range between the size of the first frame and that of the key frame. A parameter is set to determine a target minimum compression, which when exceeded causes a new key frame to be selected.

By applying Huffman decoding, we recover coefficients for a DCT transform of the image. These correspond to amplitudes for each frequency bin in a matrix of pixels. The amplitudes of a key frame are stored and the amplitudes of each subsequent image are subtracted from the corresponding coefficient. A small difference indicates little or no change.

New key frames are selected either from a timer or counter or when the following compression steps do not provide substantial savings. The first compression is to compare a frame to its key frame and determine only the differences. If the differences indicate little change, even the resolution can be reduced by zeroing high frequency data for further compression. Even significant differences in high frequency data may be zeroed if analysis of low frequency or DC data indicates the source is static noise or vibration. Advantageously, an image may be a mix of higher and lower resolution blocks if analysis of low frequency or DC data indicates that a substantial change is occurring in that part of the image.

DETAILED DISCLOSURE OF EMBODIMENTS OF THE INVENTION

All of the following transformations and logic operations are performed by an electronic circuit. As is known, image file data may be read and stored to non-transitory computer readable media and operated on by a processor controlled by instructions in a store.

A lossy compression method optimizes bandwidth and storage for a security surveillance network of appliances and event capture terminals. Taking advantage of the nature of security cameras, there is high potential for successful compression. Many images taken are the same as the previous image. Even if an image has some new content, most of the image is background or foreground, which has not changed. Security cameras are generally fixed and do not pan, zoom, or change in attitude. Lighting due to time of day will change gradually and persons or vehicles will enter, progress from one edge to another, and exit the field of view.

An event capture terminal (such as a camera) records, encodes, stores, and forwards a plurality of image files, each file compatible with standard encoders/decoders. High Definition (HD) cameras can also produce JPEG. H.264 video streams may be converted to a series of JPEG frames.

In one method a plurality of image frames are transformed into a train made of a key frame and one or more subsequent frames. By applying Huffman decoding, we recover coefficients for a DCT transform of the image. These correspond to amplitudes for each frequency bin in a matrix of pixels. The amplitudes of a key frame are stored and the amplitudes of each subsequent image are subtracted from the corresponding coefficient of a block in its key frame.

Periodically or upon conditions in the content or external events, key frames are selected from among the plurality of image files. New key frames may be selected on a number of triggers. One could be an external sensor, another from a timer or counter or file content such as when the following compression steps do not provide substantial savings. The first compression is to compare a frame to its key frame and utilize the differences in frequency coefficients. A further compression is available when the differences indicate little change, by zeroing high frequency data. Further masking of significant differences in high frequency data applies when analysis of low frequency or DC data indicates the source is static noise or vibration. Advantageously for bandwidth and storage conservation, a resulting transformed image may be a mix of higher and lower resolution blocks if analysis of low frequency or DC data indicates that a substantial change is localized to a portion of the full image.

The low pass filter is selectively applied to each pixel block within a subsequent frame. If there is substantial amplitude in DC or low frequency bins, it suggests movement into or out of the field of view. If there is no significant difference in the DC or low frequency bins, the coefficients in the high frequencies can be discarded without loss of information because they are likely to show only static, or noise, or vibration. Pixel blocks with DC and low frequency activity cause retention of the high frequency coefficients to provide a higher resolution image. An unchanging background can be lower resolution without affecting the security value. So a transformed frame may usefully have a mix of higher resolution pixel blocks and lower resolution pixel blocks. As is known, DC originally refers to direct current and distinguishes a signal value from AC or alternating current. By extension, in the frequency domain it refers to the lowest range of frequencies in a spectrum.

One detailed aspect of the invention is a method for compression of a plurality of JPEG codec compatible files (Jframe) in time, spatial, and frequency domains which has the steps: reversing Huffman encoding of a first Jframe and storing every frequency coefficient of every block of pixels in to a computer-readable store as a first key frame (Kframe); reversing Huffman encoding of an other Jframe to obtain every frequency coefficient of every block of pixels; transforming the other Jframe into a subsequent frame (subframe) by determining delta frequency coefficients for each block of pixels in the subframe; storing all of the delta frequency coefficients of each block, and Huffman encoding the stored delta frequency coefficients of each block; when the resulting file size meets the target compression goal, storing the file as a subsequent file and storing meta data relating the subsequent file to its related key file, and when the resulting file size exceeds the target compression goal, discarding the delta coefficients and storing the original frequency coefficients of all the blocks as a new key file.

A delta coefficient is the difference between a frequency coefficient of a block of pixels of a Jframe and the corresponding frequency coefficient in its preceding Kframe.

This method performs compression in time by comparing a frame taken at one point in time with a reference frame from an earlier point in time. It also compresses spatially by operating on blocks of pixel in one frame with the corresponding blocks of pixels in the reference frame. And the compression also operates in the frequency domain by subtracting each DCT frequency coefficient from its equivalent.

Another process embodiment is a method for compression of a plurality of JPEG codec compatible files (Jframe) in time, spatial, and frequency domains which includes additional steps: reversing Huffman encoding of a first Jframe and storing every frequency coefficient of every block of pixels in to a computer-readable store as a first key frame (Kframe); reversing Huffman encoding of an other Jframe to obtain every frequency coefficient of every block of pixels; transforming the other Jframe into a subsequent frame (subframe) by determining delta frequency coefficients for each block of pixels in the subframe; applying a motion trigger rule to the delta frequency coefficients of each block of pixels separately; on determining a condition that the motion trigger rule passes for each block of pixels, storing all of the delta frequency coefficients of each block, and Huffman encoding the stored delta frequency coefficients of each block; on determining a condition that the motion trigger rule fails for each block of pixels, storing zeros for all the delta frequency coefficients of each block; when the resulting file size meets the target compression goal, storing the file as a subsequent file and storing meta data relating the subsequent file to its related key file, and when the resulting file size exceeds the target compression goal, discarding the delta coefficients and storing the original frequency coefficients of all the blocks as a new key frame.

A motion trigger rule may involve the DC or the lowest frequency range of bins for a block of pixels. Above a threshold, a change from the reference coefficients of the key frame may activate a motion trigger rule.

In an embodiment, the method performed by a processor coupled to non-transitory computer readable storage further includes: applying a noise trigger rule to the delta frequency coefficients of each block of pixel separately; on determining a condition that the noise trigger rule fails for each block of pixels, storing all of the delta frequency coefficients of each block, and Huffman encoding the stored delta frequency coefficients of each block; on determining a condition that the noise trigger rule passes for each block of pixels, applying a High Frequency Coefficient (HFC) mask which zeros the H highest frequency delta coefficients of each block, and Huffman encoding the HFC masked delta frequency coefficients; and, determining a file size of a file which contains all the Huffman encoded delta frequency coefficients which have been HFC masked or not masked.

A noise trigger rule may compare high frequency components to low frequency components with a block of pixels. When delta low frequency components are substantially the same or below a threshold, while delta high frequency components are above a threshold, it may activate a noise trigger rule.

In another embodiment, the method further includes: applying a least significant bit (LSB) trigger rule to the delta frequency coefficients of each block of pixel separately; on determining a condition that the LSB trigger rule fails for each block of pixels, storing all of the delta frequency coefficients of each block, and Huffman encoding the stored delta frequency coefficients of each block; on determining a condition that the LSB trigger rule passes for each block of pixels, applying an LSB mask which zeros the L least significant bits of the delta coefficients of each block, and Huffman encoding the LSB masked delta frequency coefficients; and, determining a file size of a file which contains all the Huffman encoded delta frequency coefficients which have been LSB masked or not masked.

Within each frequency bin the least significant bits may not be perceptible to a human observer. A LSB trigger rule may be tailored for an application or a venue or time of day or the type of display or analysis. A facial recognition backend may require more bits than a human operator can use. The rule may set L the number of bits masked off.

In an embodiment, the method also includes: configuring a low pass filter; applying a configured low pass filter trigger (CLPF) rule to the delta frequency coefficients of each block of pixels separately; on determining a condition that the CLPF trigger rule fails for each block of pixels, storing all of the delta frequency coefficients of each block, and Huffman encoding the stored delta frequency coefficients of each block; on determining a condition that the CLPF trigger rule passes for each block of pixels, applying the configured low pass filter to the delta frequency coefficients of each block, and Huffman encoding the filtered delta frequency coefficients; and, determining a file size of a file which contains all the Huffman encoded delta frequency coefficients which have been filtered or not filtered.

A configured low pass filter rule may be triggered by motion, or noise, or contents of the file, or by external events such as sensors, e.g. sound, vibration, temperature. Once configured, the CLPF may be applied on a block by block basis according to its trigger rule.

In an embodiment, configuring a low pass filter includes the steps: reading a target compression ratio from a non-transitory computer readable store; determining a target compressed file size by applying the target compression ratio to a first key frame; determining a number P of highest frequency bins of delta frequency coefficients which when zeroed, cause a first subsequent frame to meet the target compressed file size; and storing P as the configuration of a low pass filter until a new key frame is selected.

In certain circumstances more than one trigger rule may be activated and more than one compression method may be applied to a frame or even to a block of pixels within a frame.

Another aspect of the invention is in the embodiment of circuits of a first appliance locally attached to a network of event capture terminals transforms and stores a plurality of image frames into a key frame and at least one subsequent frame. Meta data is stored separately or within the file headers of key frames and subsequent frames to enable decompression of a single subsequent frame.

Figure 2:
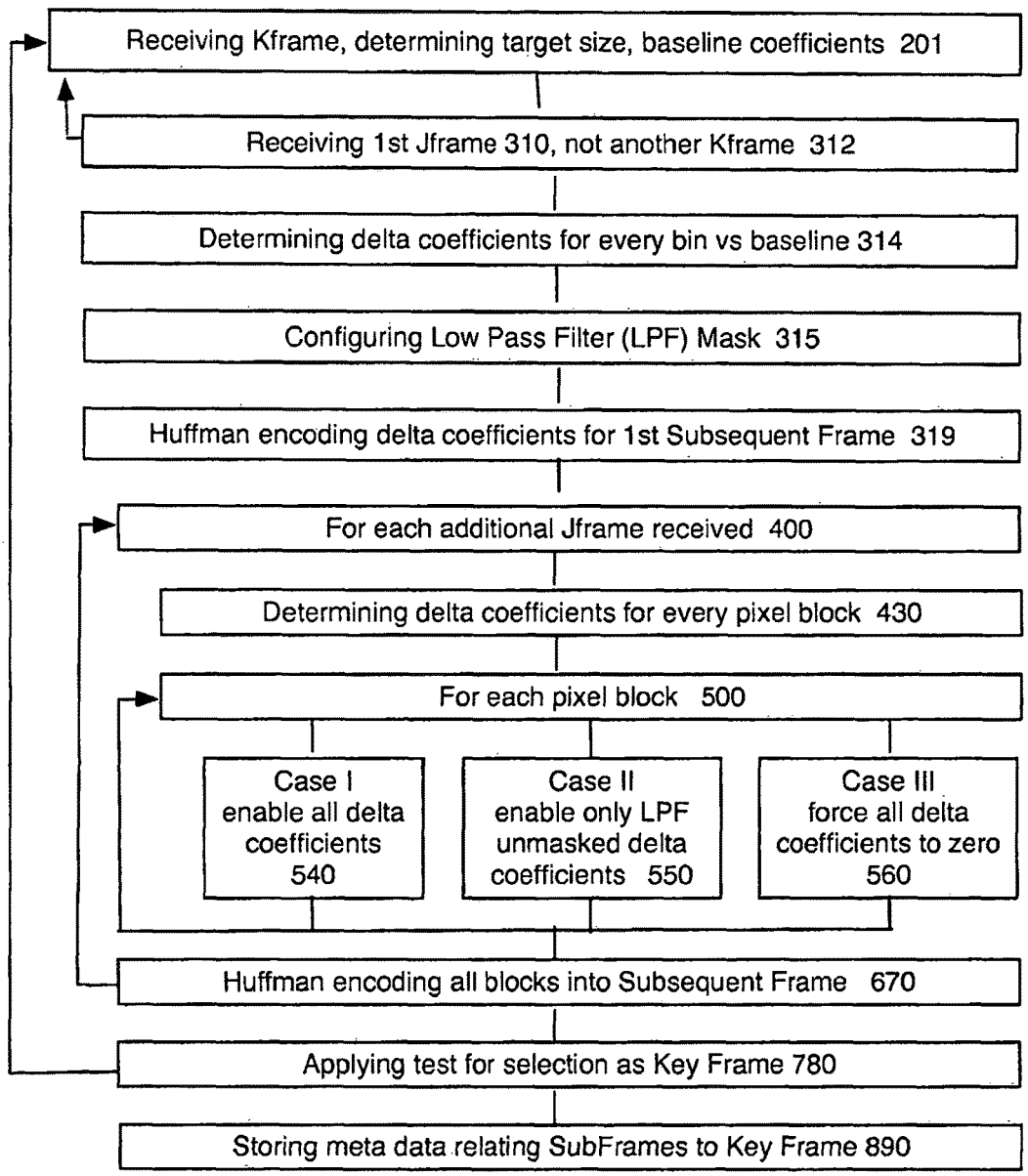
FIGS. 2-4 are flowcharts of steps in a method performed by a processor.

Referring now to the figures, a method embodiment is illustrated in FIG. 2 to assist in apprehension of the subject matter. A method embodiment which is performed by a processor controlled by computer executable instructions stored in non-transitory media includes: Receiving a Key Frame (Kframe), storing size, determining target size for subsequent frames, and recovering baseline frequency bin coefficients for every pixel block by reversing Huffman encoding of a JPEG codec compatible image file (Jframe); 201 Several methods are disclosed infra to test a Jframe for selection as a Key Frame. Once selected, its frequency coefficients are used to determine delta coefficients for subsequent frames. Receiving 1st Jframe following Kframe 310; while unlikely due to the nature of security surveillance systems, the method includes determining not another Kframe 312; Determining delta coefficients for every frequency bin of every block of Jframe by reversing Huffman encoding and subtracting each frequency bin coefficient from its Kframe correspondent; 314 Configuring Low Pass Filter Mask to achieve target size for 1st subsequent frame 315 by setting an integer to denote the number of high frequency bins that are masked out up to a fixed minimum Low Pass Filter bandwidth (minLPF limit); Huffman encoding delta coefficients to generate 1st Subsequent Frame (subFrame); 319

For each additional Jframe after the 1st subFrame until a next Kframe is selected 400: Reversing Huffman encoding to recover frequency bin coefficients for every block; 420 Determining delta coefficients for every frequency bin of every pixel block of frame 430 by reversing Huffman encoding and subtracting each frequency bin coefficient from its correspondent in the Kframe. For each pixel block of the Jframe 500, one of the following steps: Case I: When delta DC coefficient is greater or equal to a DC threshold, enabling all delta coefficients in the block; 540 Case II: When delta DC coefficient is less than the DC threshold, and a sum of a group of high AC delta coefficients exceeds an AC threshold, enabling only LPF unmasked delta coefficients in the block; 550 Case III: When delta DC coefficient is less than the DC threshold, and a sum of a group of high AC delta coefficients is less than or equal to the AC threshold, forcing all delta coefficients in the block to zero; 560 When all pixel blocks of the Jframe have been transformed, Huffman encoding all the blocks to generate a next Subsequent Frame; 670 which returns the process to step 400; Applying qualification test for selection as a Key Frame 780 which would return the process to step 201; and [0084] Storing meta data relating each Subsequent Frame (SubFrames) to a Key Frame in the file headers or in a separate table 890.

It can be appreciated that the sequential exposition of the method steps is presented for clarity and not as a limitation precluding embodiment processes that may be efficiently performed in parallel or different order by circuits or processor threads.

Various methods can be employed to select a Key Frame from among a plurality of JPEG codec compatible image files. In an embodiment, a maximum period in time or in number of frames can be set as a parameter. When that maximum is met, an image is selected as a new key frame. All the frames following will be compared to the key frame until a new key frame is selected.

One aspect of the invention is an exemplary apparatus having a circuit to receive JPEG codec compatible files and reverse Huffman encoding to obtain frequency coefficients for each pixel block; a circuit to distinguish key frames from subsequent frames; a circuit to set a configurable low pass filter for each train of a key frame and its subsequent frame or frames; a circuit to determine delta coefficients for each frequency bin of each pixel block; a circuit to selectively zero insignificant delta coefficients; and a circuit to apply the configurable low pass filter to selected pixel blocks.

In an embodiment, the apparatus also has a circuit to Huffman encode delta coefficients into a JPEG codec compatible file and store meta data to relate a subsequent frame to its key frame. In an embodiment, the circuit to apply the configurable low pass filter is controlled by the magnitude of the delta coefficients in certain low frequency bins. In an embodiment, the circuit to set a configurable low pass filter determines the minimum number of high frequency coefficients to mask out to achieve a target compression size.

Another aspect of the invention is an exemplary method for transforming JPEG codec compatible files by a processor communicatively coupled to at least one event capture terminal and coupled to a non-transitory computer-executable instruction store, the method comprising: reading a first target compression ratio store; receiving a first JPEG codec compatible image file; determining a post-compression target file size; receiving a second JPEG codec compatible image file (Jframe); decoding frequency bin coefficients for each pixel block of the first Jframe and of the second Jframe by reverse Huffman encoding; determining an integer value to configure a low pass filter mask; determining a difference between each pair of respective coefficients of a pixel block in the first Jframe and its corresponding pixel block in the second Jframe; determining when the difference between each pair of respective coefficients of the low pass filter masked frequency bins is less than a threshold; and on the condition that the differences for all masked bits are below the threshold; forcing the difference values of masked frequency bins to zero.

In an embodiment the process of determining an integer value to configure a low pass filter mask comprises: reading an integer value for a fixed minimum Low Pass Filter (minLPF) mask representing a limit to a number of high frequency bins which may be set to zero, reading the post-compression target file size; determining the smallest integer value integer which successfully achieves the post-compression target file size; and storing the lesser of minLPF or the smallest integer value which successfully achieves the post-compression target file size as the integer value to configure a low pass filter mask.

In an embodiment the method also includes determining that a 1st JPEG codec compatible image file (Jframe) is a key frame by one of periodically or upon conditions in the content or external events, selecting a Jframe from among the plurality of image files by an external event, image content, periodicity in time or count, or quantity of data stored.

In an embodiment the method also includes storing metadata to identify the relationship and location of key frames and subsequent frames.

In an embodiment the method also includes writing meta data into file headers for Kframes and subframes to identify their relationship.

In an embodiment the method also includes Huffman encoding the difference values of all pixel blocks of the second Jframe to provide a JPEG compatible subsequent frame file.

Another aspect of the invention is an exemplary method for transforming JPEG codec compatible files by a processor communicatively coupled to at least one event capture terminal and coupled to a non-transitory computer-executable instruction store, the method includes the steps: reading a first target compression ratio store; receiving a first JPEG codec compatible image file; determining a post-compression target file size; receiving a second JPEG codec compatible image file (Jframe); decoding frequency bin coefficients for each pixel block of the first Jframe and of the second Jframe by reverse Huffman encoding; selecting the first Jframe as a key frame (Kframe) and the second Jframe as a subsequent frame (subframe); differencing coefficients of a key frame and a subsequent frame; re-encoding the difference in coefficients as a JPEG compatible subsequent frame; determining when the resultant subsequent frame meets the required target size; and on the condition that the resultant subsequent frame meets the required target size, storing the file and annotating the meta data with the relationship of the subsequent file to the key file; or on the condition that the resultant subsequent frame fails to meet the required target size, discarding it and designating the second Jframe as a second key frame.

In an embodiment, the method also includes determining the absolute magnitude of the difference between the coefficients of certain low frequency bins of the key frame and the subsequent frame; summing the absolute magnitude of the differences between the coefficients of certain low frequency bins; on the condition when the sum of the absolute magnitude of the coefficients of certain low frequency bins exceeds a threshold, enabling all of the differences between coefficients in all of the frequency bins to be available for re-encoding into a JPEG compatible file.

In an embodiment the method also includes determining the absolute magnitude of the difference between the coefficients of certain low frequency bins of the key frame and the subsequent frame; summing the absolute magnitude of the differences between the coefficients of certain low frequency bins; on the condition when the sum of the absolute magnitude of the coefficients of certain low frequency bins is below a threshold, enabling only the coefficients of the low pass filter mask frequency bins for re-encoding into a JPEG compatible file.

In an embodiment the method also includes reading an integer value for a fixed minimum Low Pass Filter (minLPF) mask representing a limit to a number of high frequency bins which may be set to zero; reading the post-compression target file size; determining the smallest integer value integer which successfully achieves the post-compression target file size; storing the lesser of minLPF or the smallest integer value which successfully achieves the post-compression target file size as the integer value to configure a low pass filter mask; and designating the non-masked bits of the low pass filter as indicators of certain low frequency bins.

In a useful application which illustrates the benefits and the principles of the subject of the application a local area network couples security cameras to a compression apparatus. It is desirable that the long-term image storage be offsite to protect against theft or destruction. Lower resolution image files in JPEG compatible file formats are pushed across a public wide area network to a cloud storage service. To avoid congestion, a maximum bit rate is allocated to the security service at all times. The apparatus adaptively applies a set of compression rules and methods to meet the allocated budget for image transmission.

All the difference transformations are done in frequency space, which means it only requires Huffman encoding/decoding of JPEG files which is very fast. In addition, when motion detection is performed in DCT space, decoding all previews to this level can be done only once.

In an embodiment, the method further comprises when the difference results are high relative to a threshold; determining the image file is a new key file; storing the coefficients; and transmitting the image file to remote storage services as a new key file.

In an embodiment, the method further comprises when the difference results for low frequency coefficients is small and the difference results for high frequency coefficients are high, determining the pattern corresponds to static noise or vibration and setting the high frequency difference results to zero; when the difference results for low frequency coefficients is large and the difference for high frequency coefficients are high, determining the pattern corresponds to movement and storing the high frequency differences as computed.

In an embodiment, the method further comprises reading from non-transitory media a minimum threshold of compression parameter; determining a ratio of compression for each Huffman encoded difference file to its key file; and on the condition that the ratio passes the minimum threshold, transmitting the difference file to remote storage, or on the condition that the ratio fails the minimum threshold, transmitting the image file to remote storage and storing its coefficients as a new key file.

In an embodiment, the method further comprises when the difference results are high relative to a threshold; determining the image file is a new key file; storing the coefficients; and transmitting the image file to remote storage services as a new key file.

In an embodiment, the method further comprises when the difference results for low frequency coefficients is small and the difference results for high frequency coefficients are high, determining the pattern corresponds to static noise or vibration and setting the high frequency difference results to zero; when the difference results for low frequency coefficients is large and the difference for high frequency coefficients are high, determining the pattern corresponds to movement and storing the high frequency differences as computed.

In an embodiment, the method further comprises reading from non-transitory media a minimum threshold of compression parameter; determining a ratio of compression for each Huffman encoded difference file to its key file; and on the condition that the ratio passes the minimum threshold, transmitting the difference file to remote storage, or on the condition that the ratio fails the minimum threshold, transmitting the image file to remote storage and storing its coefficients as a new key file.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 3:
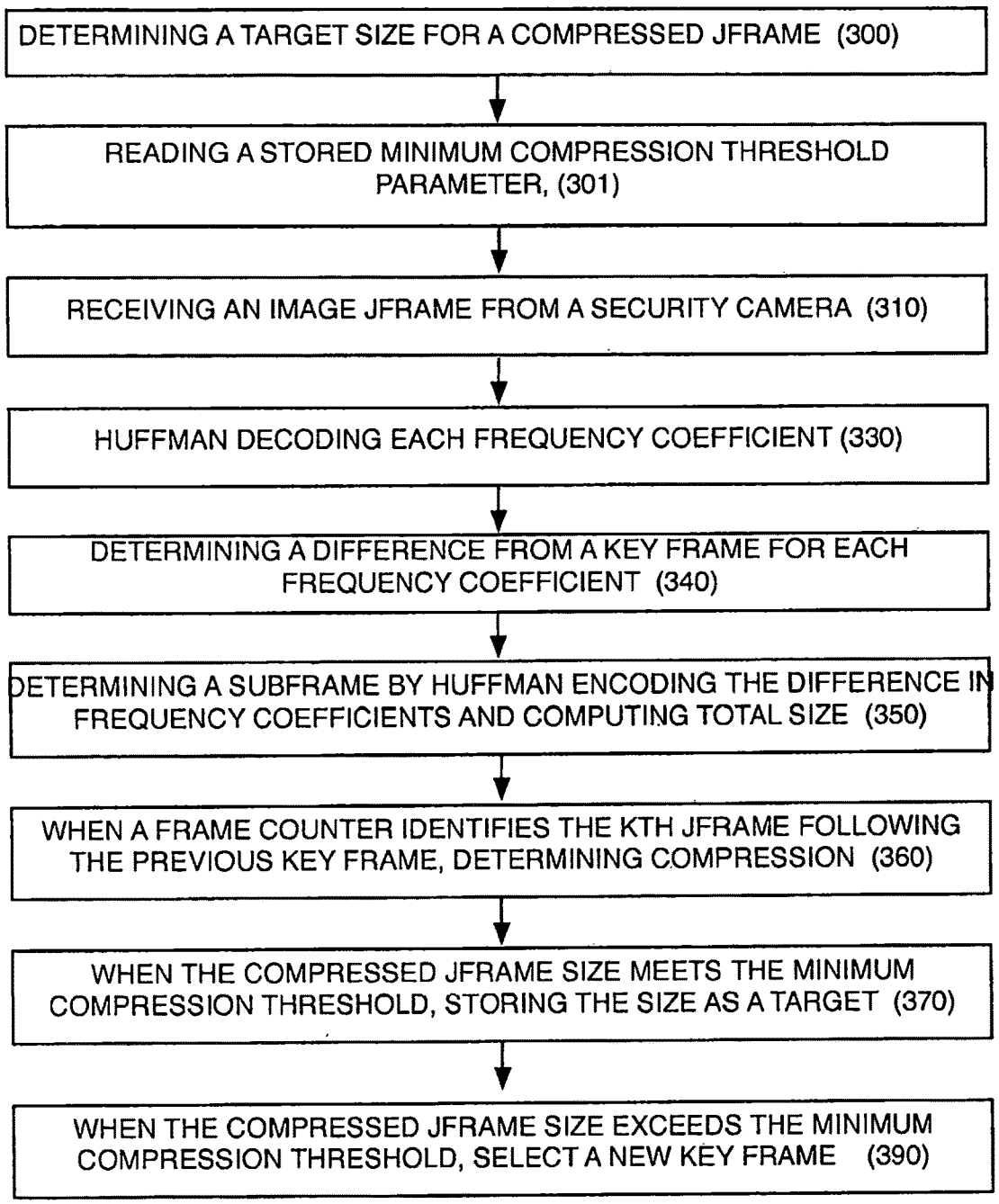

Referring now to FIG. 3, another embodiment of the present invention is a method performed by a computer processor when executing instructions stored in non-transitory computer readable media, the method for determining a compressed Jframe 200. By Jframe we mean an image file recorded by a security surveillance camera and stored as a JPEG codec compatible file. The method includes reading a stored minimum compression threshold parameter 301; receiving an image frame from a security camera 310; Huffman decoding each frequency coefficient 330 for each block of pixels in the image; determining a difference from a key frame for each frequency coefficient 340 for every block; determining a subframe by Huffman encoding the difference in frequency coefficients and computing total size 350; when a frame counter identifies the Kth subframe following the previous Key frame, determining compression 360; when the Kth subframe meets the minimum compression threshold, storing the size as a target 370; and when the subframe exceeds the minimum compression threshold, select a new key frame 390.

Figure 4:
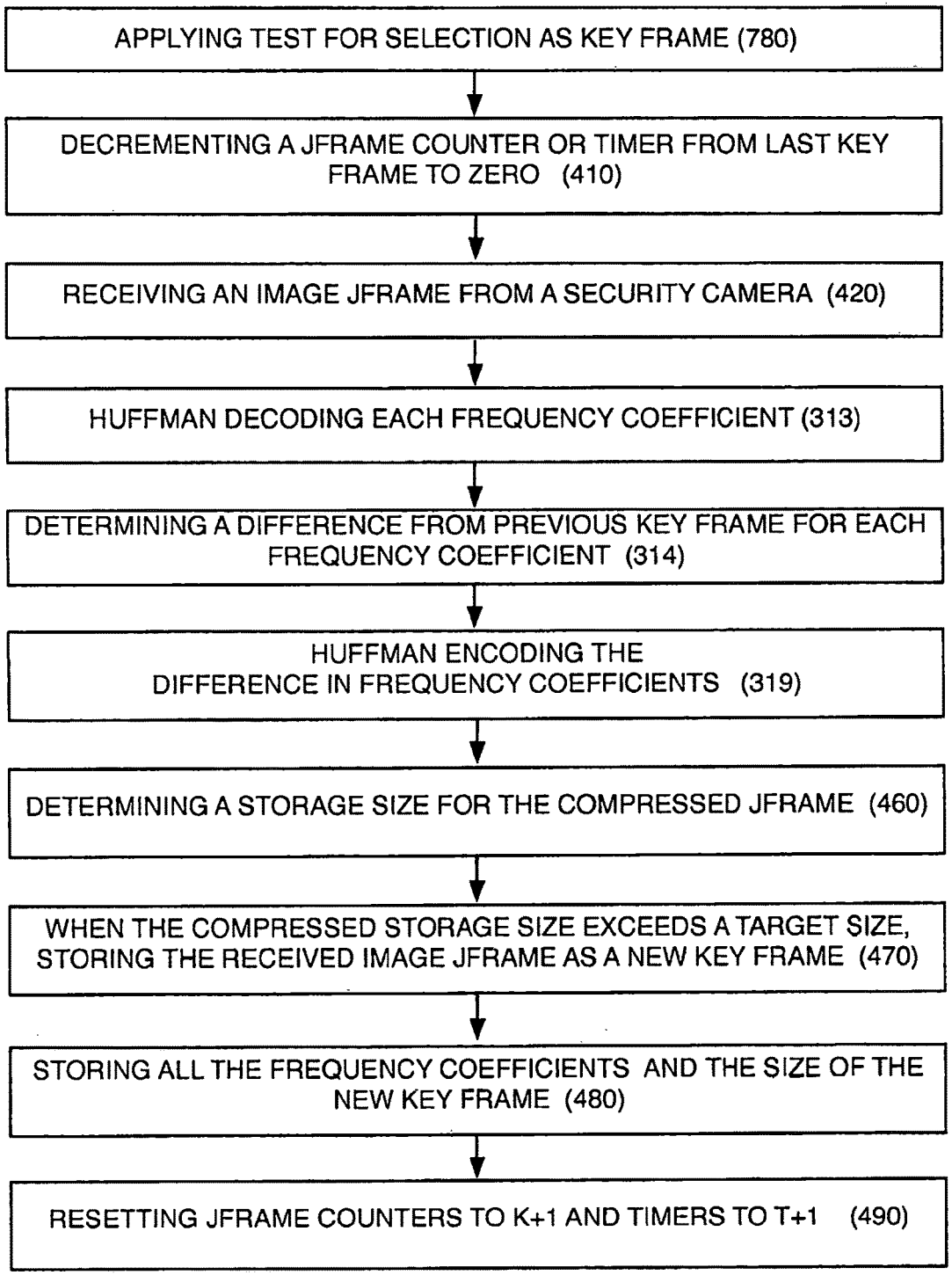

Referring now to FIG. 4, an aspect of the invention is a method by a processor applying a test for selection as Key Frame 780. The method includes decrementing a Jframe counter or timer from the last key frame which counts down to zero 410; receiving an image Jframe from a security camera 420; Huffman decoding each frequency coefficient 313 of a block in the image Jframe; determining a difference from previous key frame for each frequency coefficient 314; Huffman encoding the differences in frequency coefficients 319; determining a storage size for the compressed Jframe 460; when the compressed storage size exceeds a target size, storing the received image Jframe as a new key frame 470; storing all the frequency coefficients of the new key frame and the size of the new key frame 480; and resetting Jframe counters to K+1 and timers to T+1 490.

Figure 5:
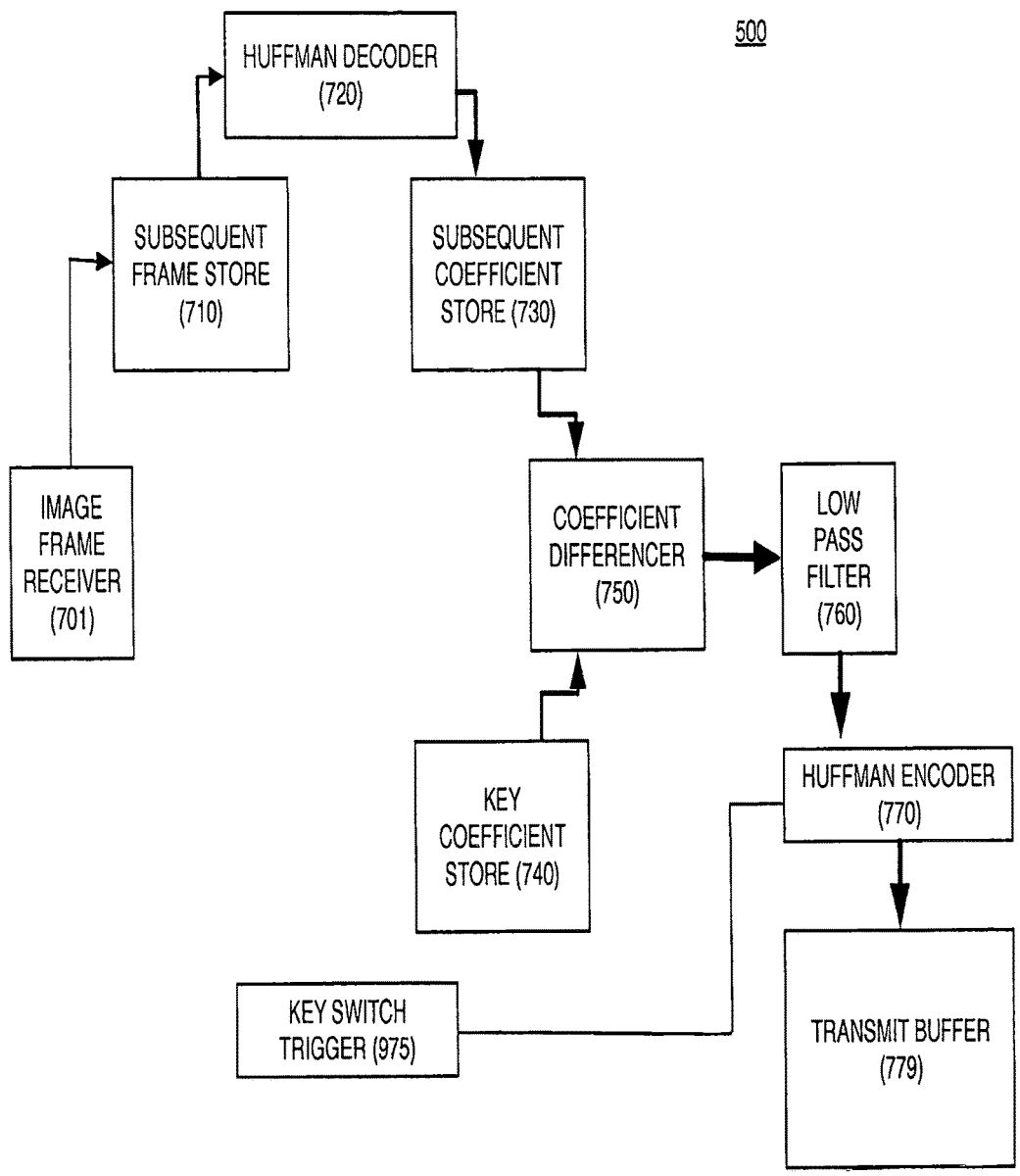
FIGS. 5-7 are block diagrams of an apparatus in a system.

Referring now to FIG. 5, an apparatus embodiment 500 of the present invention includes an image frame receiver 701 which receives JPEG compatible files from a plurality of network attached security surveillance cameras (not shown). The image frame receiver is coupled to a subsequent frame store 710. The subsequent frame store is coupled to a Huffman decoder 720 which reverses part of the JPEG encoding process to yield coefficients for each block of pixels. The coefficients which correspond to amplitudes of a DCT transformation are stored into the attached subsequent coefficient store 730. A key frame has previously been selected, decoded, and stored. Its respective coefficients are read from a key coefficient store 740. Both stores are coupled to a coefficient differencer circuit 750 which subtracts the coefficients of the subsequent frame from the coefficients of the key frame. The coefficient differencer 750 is coupled to a low pass filter circuit 760 which zeros the amplitudes of selected high frequency terms. That is, the high frequency components of a subsequent frame are discarded. The remaining coefficients are Huffman encoded to create a JPEG compatible file but which only has the differences of certain coefficients between the key frame and the subsequent frame. A key switch trigger 975 may determine that the degree of compression is satisfactory. The Huffman encoded difference file is stored into a transmit buffer 779 for eventual uploading through a wide area network to a storage service.

Figure 6:
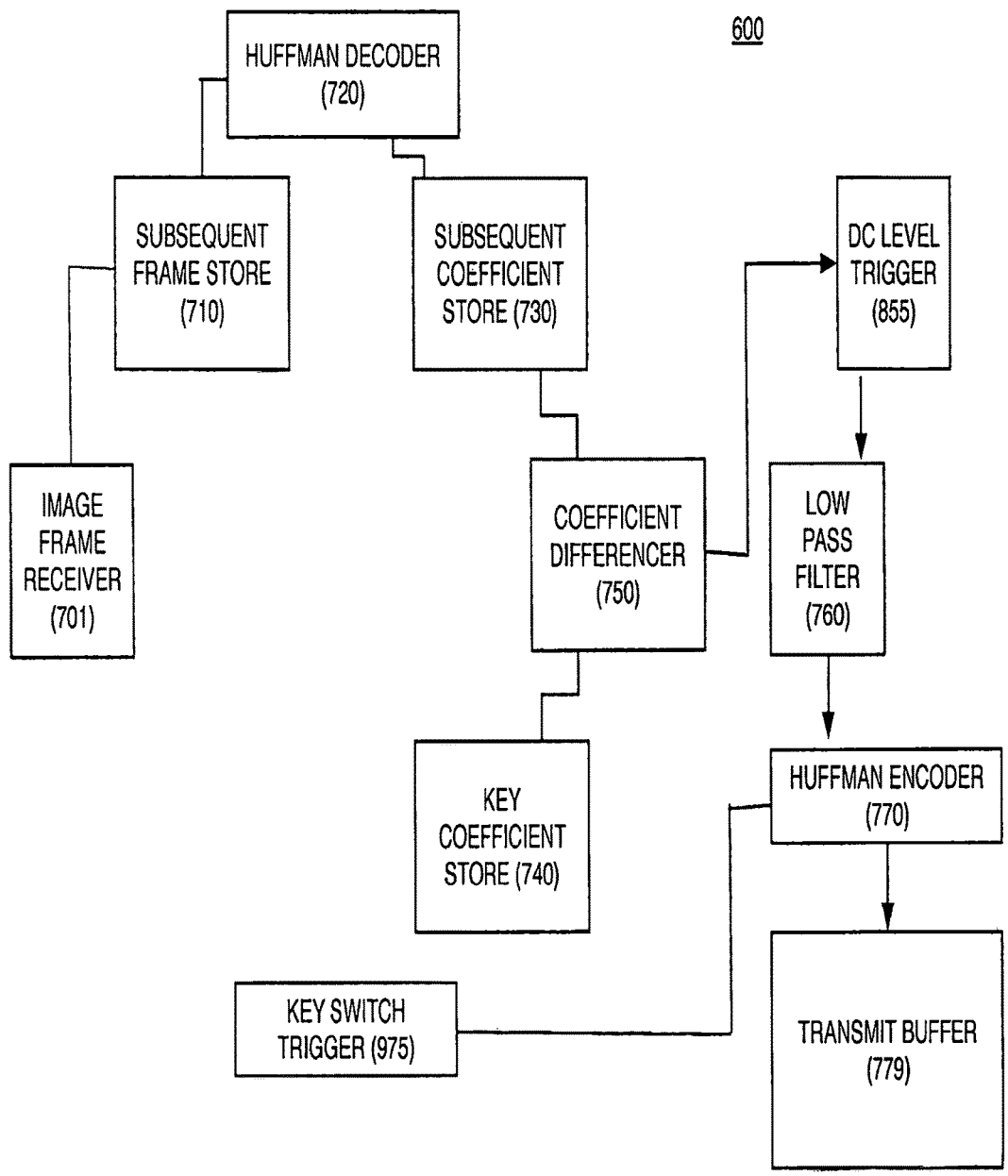

Referring now to FIG. 6, an apparatus embodiment 600 of the present invention also includes a DC level trigger circuit 855 which is coupled to the output of the coefficient differencer 750, and to the input of the low pass filter 760. In an embodiment the DC level trigger is also coupled to the Huffman encoder 770 (not shown). Depending on various stored parameters, also not shown, the DC level trigger enables or disables the low pass filter 760 to zero selected high frequency components. That is, the DC level trigger enables noise filtering on the condition that the DC or low frequency components of the image are not substantially different from the key frame. When they are substantially different, a higher resolution block of pixels is passed to the Huffman encoder 770. Beneficially, those blocks of the image which are substantially unchanging will have noise reduction and those blocks with significant change will have higher quality of resolution. Illustrated in FIG. 6 is the scenario in which the increased data of some blocks has not grown to a level which causes the key switch trigger 975 to activate so the resulting mixed resolution image is stored into the transmit buffer 779.

Figure 7:
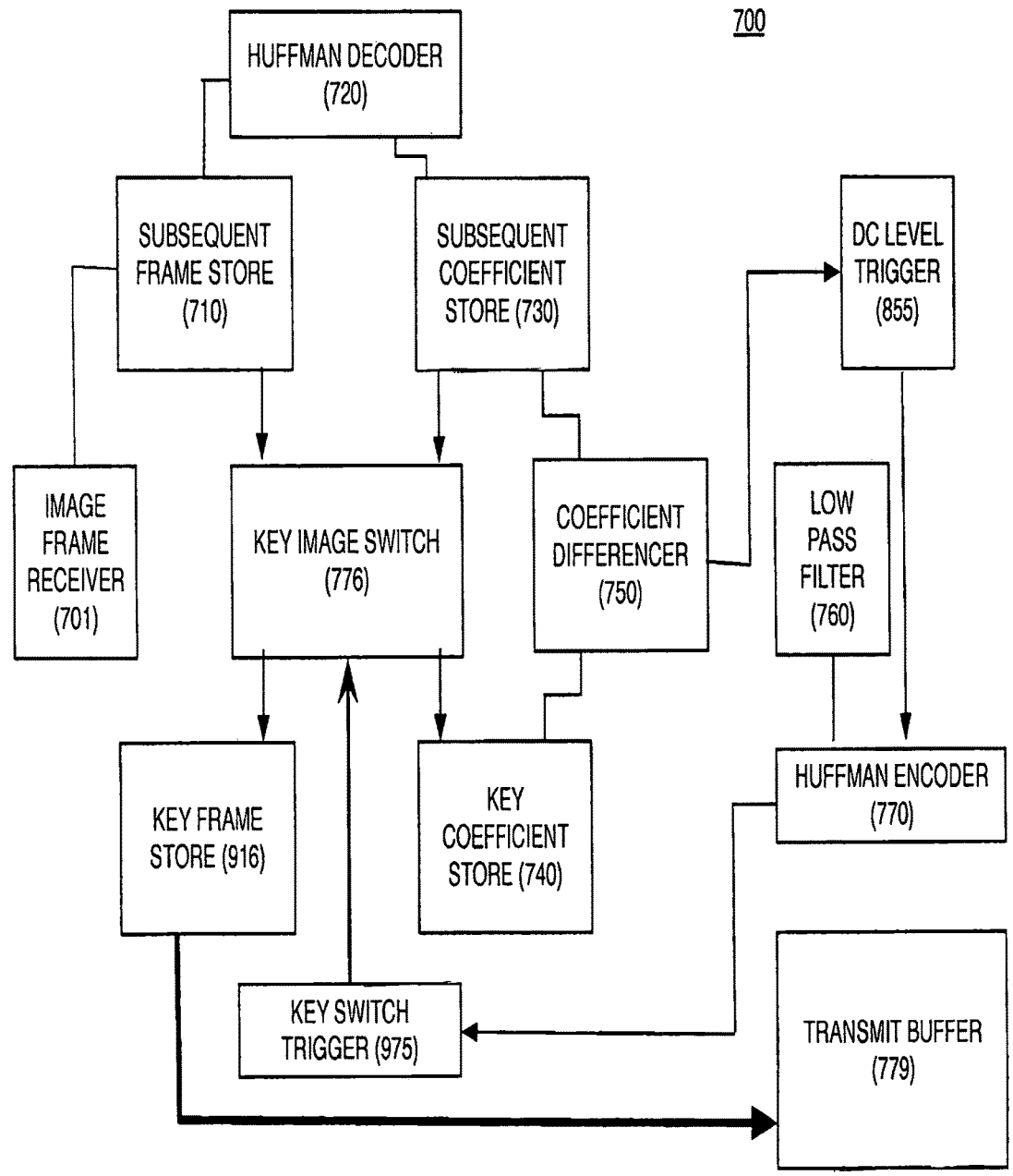

Referring now to FIG. 7, an apparatus embodiment 700 of the present invention also includes a key image switch circuit 776 which is coupled to the subsequent frame store 710 and a key frame store 916, and is coupled to the subsequent coefficient store 730 and the key coefficient store 740. The key image switch 776 is controlled by a key switch trigger circuit 975 which is coupled to the Huffman encoder 770. The key frame store 916 is further coupled to a transmit buffer 779. A new key frame may be selected for a number of reasons: there may be a counter or timer to establish a maximum period for transmitting a key frame from which all subsequent frames are differenced. But a beneficial aspect of the present invention is to adaptively select key frames to perform compression on a series of JPEG compatible image frames. In the example shown, the DC level trigger 855 determines that one or more blocks of the image have substantially changed and disables the low pass filter 760 from zeroing high frequency coefficients. After the encoding of the difference frame in the Huffman encoder 770, the size of the result and the degree of compression attained is compared with a target size by the key switch trigger 975. When the key switch trigger determines that the compression is no longer sufficiently advantageous (according to stored parameters not shown), the key image switch selects the current subsequent frame as a new key frame by transferring the subsequent frame from the subsequent frame store 710 into the key frame store 916 and also to the transmit buffer 779. The contents of the subsequent coefficient store 730 are also transferred to the key coefficient store 740. Embodiments of the circuits may also read out the subsequent frame store 710 directly to a transmit buffer 779 as the following subsequent frame is read in. Circuit functionalities herein disclosed may be combined into more complex circuits or parallel processor instructions without changing the claimed invention.

An apparatus receives image frames from security video cameras. If the images are already encoded using a JPEG compatible codec, they are transformed by Huffman decoding to produce a plurality of blocks having amplitudes as frequency coefficients.

Compression is controlled by a set of parameters which includes selection of key frames.

A change exceeding a threshold in lower-frequency amplitudes, determined by a set of parameters, controls noise filtering. Changes in higher frequency coefficients are not encoded when the size of images exceeds a target.

After high-frequency amplitudes have been clipped to remove noise from selected blocks, the remaining frequency amplitudes of the subsequent frame is compared with a key frame and a delta frame is determined. The amount of compression achieved by the delta is computed and tracked. Each delta is transformed by Huffman encoding and stored as a JPEG unless the amount of compression is decreasing. On that condition, a new key frame is selected.

One aspect of the present invention performs, by a processor, delta compression of jpeg preview images. A key frame is stored in non-transitory media, and a subsequent frame is encoded as deltas from that key frame. The amount of compression being achieved is tracked, and when it starts decreasing a new key frame is generated. The delta frames are also encoded as jpeg compatible files, so they also benefit from the JPEG codec's compression/encoding gains. Thus, if one displays a raw delta frame, it appears as an all grey preview because each block of frequency coefficients are difference values between coefficients of a key frame and coefficients of a subsequent image frame. For static scenes, the embodiment has achieved about 4.times. compression. All of this is "unwound" within the archiver, so has no impact on external APIs.

All the difference transformations are done in frequency space, which advantageously requires only Huffman encoding/decoding of JPEG files which is very fast. In addition, when motion detection is performed in DCT space, decoding all previews to this level can be done only once.

JPEG files are encoded in a "spatial frequency" dimension. At night, cameras normally move to very high gain settings, which creates "speckle" noise—each pixel has small relatively random noise added to it. This creates a lot of high frequency noise and cause JPEG (and any other video compression scheme) to produce much larger images. In the present invention, the method arbitrarily "clips" this data, not encoding changes in the higher frequencies when it determines the size starting to grow out of control.

While this clipping it normally invisible, where motion is actually occurring the clipping can significantly degrade the utility of the resulting image. To avoid this, if a JPEG block has significant change in the lower frequency coefficients the clipping is prevented. Contrary to privacy considerations, it is the home intruder who is kept in highest definition while the pixel blocks of static room occupants are compressed into lower resolution.

A system provides a cloud based archival and presentation apparatus communicatively coupled by a unreliable low bandwidth wide area network to a transmission apparatus locally networked to a plurality of conventional security video capture devices. The transmission apparatus receives a sequence of images, determines motion, removes noise, selects key frames, compresses interstitial frames, and transmits compressed jpeg previews to the archival and presentation apparatus.

One aspect of the invention is a method for operation of a system performed at processors executing computer-instructions encoded in non-transitory media on data stored in electronic circuits by: at a transmission apparatus coupled to a plurality of security video capture devices, receiving image files split into blocks of 8.times.8 pixels, transformed by a Discrete Cosine Transform (DCT) into frequency bins. A DCT is similar to a Fourier transform in the sense that it produces a kind of spatial frequency spectrum; decompressing the data by transforming the image file components by applying a variant of Huffman encoding; reading the amplitudes of the frequency components which include high-frequency components, mid-frequency components, and low-frequency components; determining motion; reading stored parameters which control noise suppression; suppressing noise components when determining motion is not true; reading stored parameters which control selection of key frames; selecting a first key frame; comparing a plurality of subsequent frames to the first key frame; determining a delta frame between each subsequent frame and a first key frame; determining an amount of compression which each delta frame has over the first key frame, while the amount of compression is not decreasing for each subsequent frame, encoding and storing the delta frame with JPEG transformation; while the amount of compression is decreasing, discarding the delta frame and selecting a second key frame; and transmitting key frames and delta frames to an archival apparatus.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

FIG. 1 is a block diagram of an exemplary processor that may be used to perform one or more of the functions described herein. Referring to FIG. 1, processor 100 may comprise an exemplary client or server process. Processor 100 comprises a communication mechanism or bus 111 for communicating information, and a processor core 112 coupled with bus 111 for processing information. Processor core 112 comprises at least one processor core, but is not limited to a processor core, such as for example, ARM™, Pentium™, etc.

Processor 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor core 112.

Processor 100 also comprises a read only memory (ROM) and/or other static storage device 106 coupled to bus 111 for storing static information and instructions for processor core 112, and a non-transitory data storage device 107, such as a magnetic storage device or flash memory and its associated control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless network interface 125 for communicating selections and command and data input to processor core 112.

Figure 8:
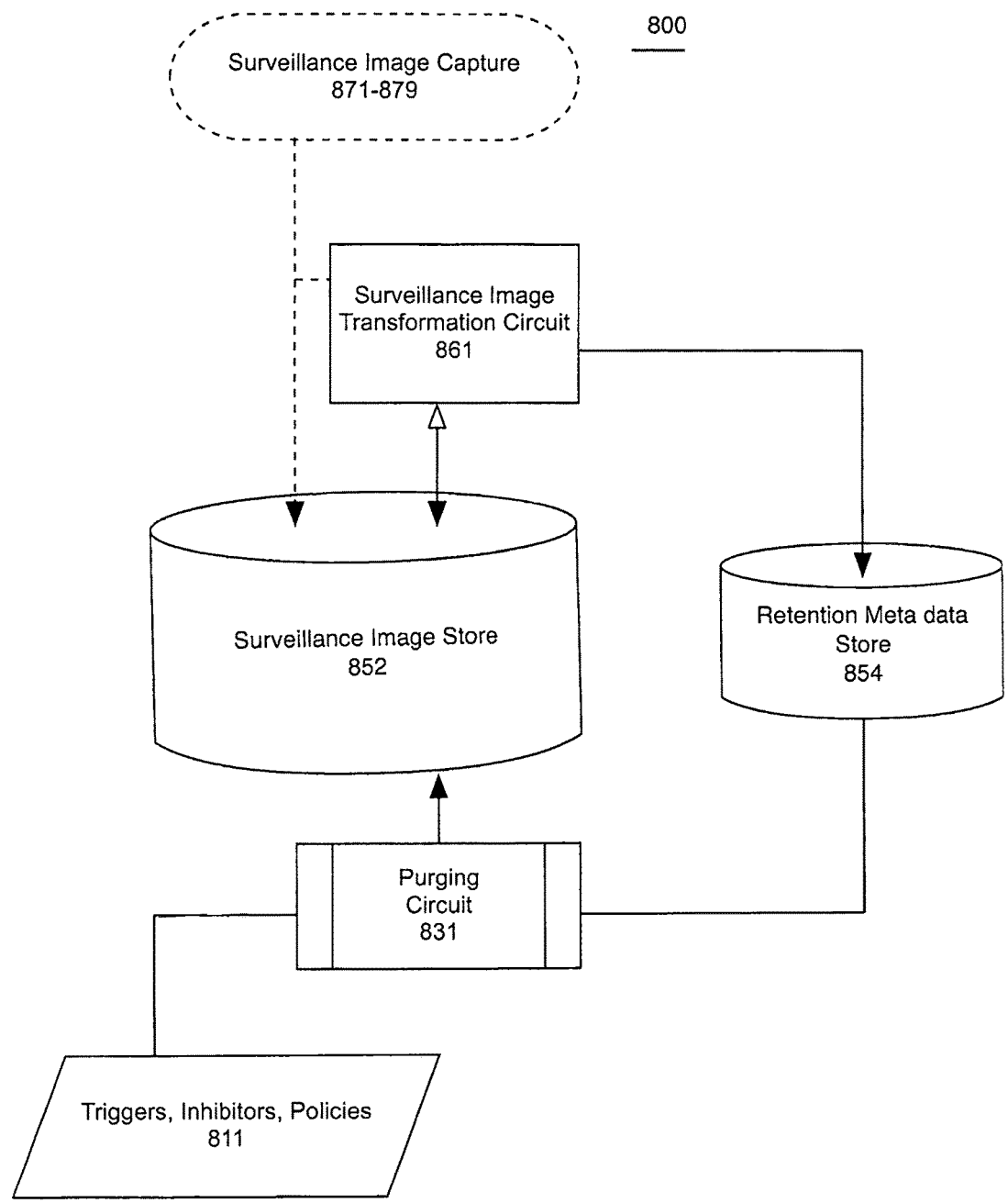
FIG. 8-9 are block diagrams of an optimized surveillance image storage apparatus.
Figure 9:
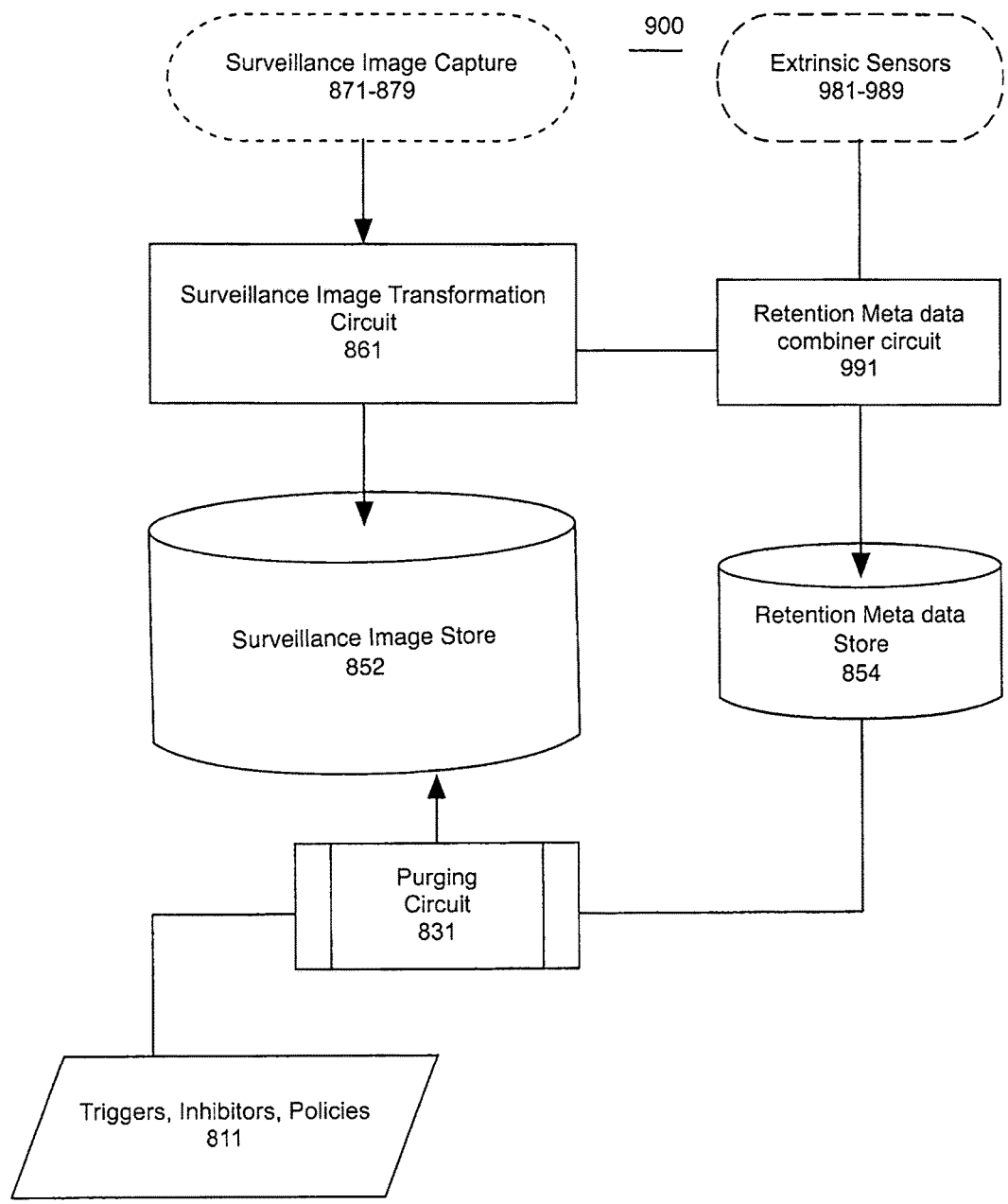

Referring to FIGS. 8-12, one aspect of the content-driven storage optimization invention is a content-driven surveillance storage optimization apparatus 800 of FIG. 8 which includes: a purging circuit 831; a surveillance image transformation circuit 861; a surveillance image store 852 communicatively coupled to the purging circuit and to the surveillance image transformation circuit; a retention meta data store 854 communicatively coupled to the purging circuit and to the surveillance image transformation circuit; and a triggers, inhibitors, policies controller 811 communicatively coupled to the purging circuit, whereby transformed content of the surveillance images provides retention meta data to be used by the purging circuit when activated by the controller to select images for deletion. In an embodiment, the surveillance image store is directly coupled to at least one surveillance image capture unit 871-879. In an embodiment, the surveillance image transformation circuit is directly coupled to at least one surveillance image capture unit 871-879. In an embodiment, transformation includes the step of producing a stream of JPEG compatible images from an H.264 protocol of high definition video.

If there is substantial amplitude in DC or low frequency bins, it suggests movement into or out of the field of view. As is known, DC originally refers to direct current and distinguishes a signal value from AC or alternating current. By extension, in the frequency domain it refers to the lowest range of frequencies in a spectrum.

A surveillance image transformation circuit includes an image frame receiver which receives JPEG compatible files from a plurality of network attached security surveillance cameras. The image frame receiver is coupled to a subsequent frame store. The subsequent frame store is coupled to a Huffman decoder which reverses part of the JPEG encoding process to yield coefficients for each block of pixels. The coefficients which correspond to amplitudes of a DCT transformation are stored into the attached subsequent coefficient store. A key frame has previously been selected, decoded, and stored. Its respective coefficients are read from a key coefficient store. Both stores are coupled to a coefficient differencer circuit which subtracts the coefficients of the subsequent frame from the coefficients of the key frame.

The coefficient differencer is coupled to a DC level trigger which determines that one or more blocks of the image have substantially changed and records a metric into retention meta data store.

A motion measure circuit involves the DC or the lowest frequency range of bins for a block of pixels. Above a threshold defined in a purging directive, a magnitude of change from the reference coefficients of the key frame may set a retention flag. The purging directive may include other triggers or policies to control retention. Thresholds may be set for sensor energy, for age relative to recordation or usage, and combinations of age and magnitude of movement. A store of policies and rules such as injunctions is coupled to a controller. The purging circuit includes a circuit to read retention meta data, a circuit to read purging directives, and a circuit to set a retention flag by applying the directives to retention meta data. The purging circuit issues file operation commands according to the result of matching retention meta data with thresholds, triggers, and policies of the purging directives.

In an embodiment, the controller triggers on free space and least or most recently used file I/O. In an embodiment, the controller triggers on calendars, policies, court orders, and statutory requirements. In an embodiment illustrated in FIG. 9, the apparatus 900 also includes a retention meta data combiner circuit 991, coupled to the retention meta data store 854, and coupled to the surveillance image transformation circuit 861; whereby metrics received from extrinsic sensors 981-989 are correlated and combined into retention meta data and stored into the retention meta data store to influence the purging circuit. In various embodiments, extrinsic sensor metrics are at least one of the group: sound energy, vibration energy, physical access control events, and thermal energy.

Other extrinsic sensors include chemistry, heart rate, and bio-metrics.

Figure 10:
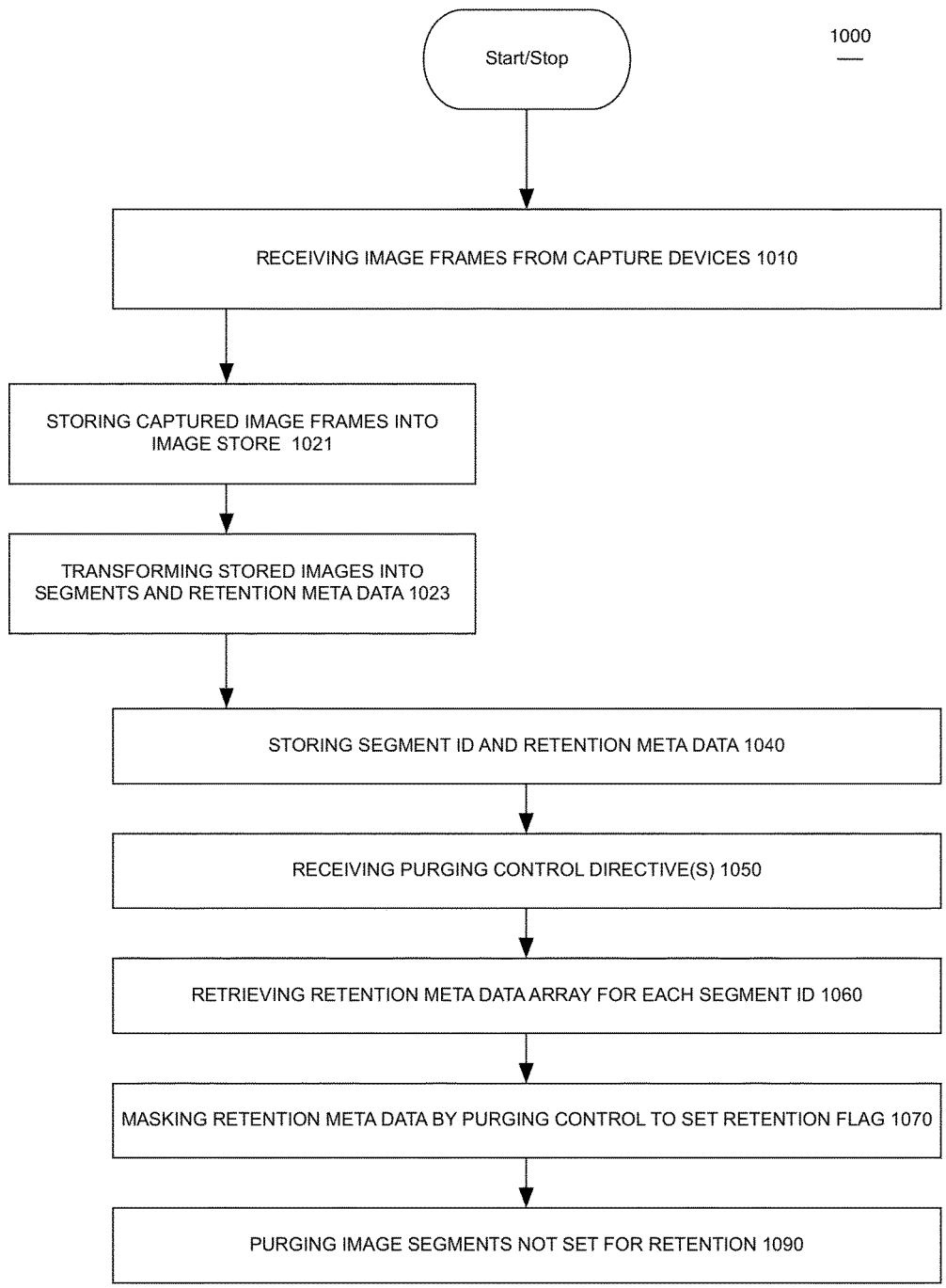
FIG. 10-12 are flowcharts of a method for purging surveillance image storage.

As illustrated in FIG. 10, the surveillance storage optimization method 1000 includes: receiving one or more purging control directives 1050; retrieving a retention meta data array for each of a plurality of image segment identifiers 1060; masking each retrieved retention meta data array by each received purging control directive to set a retention flag for each image segment identifier 1070; and purging from surveillance image store, the image segments corresponding to image segment identifiers not set for retention 1090. In an embodiment, a retention meta data array includes a metric of relative movement within the image segment. In an embodiment of the invention, the method further includes transformation step of image frames including: receiving surveillance image frames from capture devices 1010; storing captured surveillance image frames into a surveillance image store 1021; transforming stored captured surveillance image frames into image segments and retention meta data arrays 1023; and storing image segment identifiers and retention meta data arrays into a retention meta data store 1040.

Figure 11:
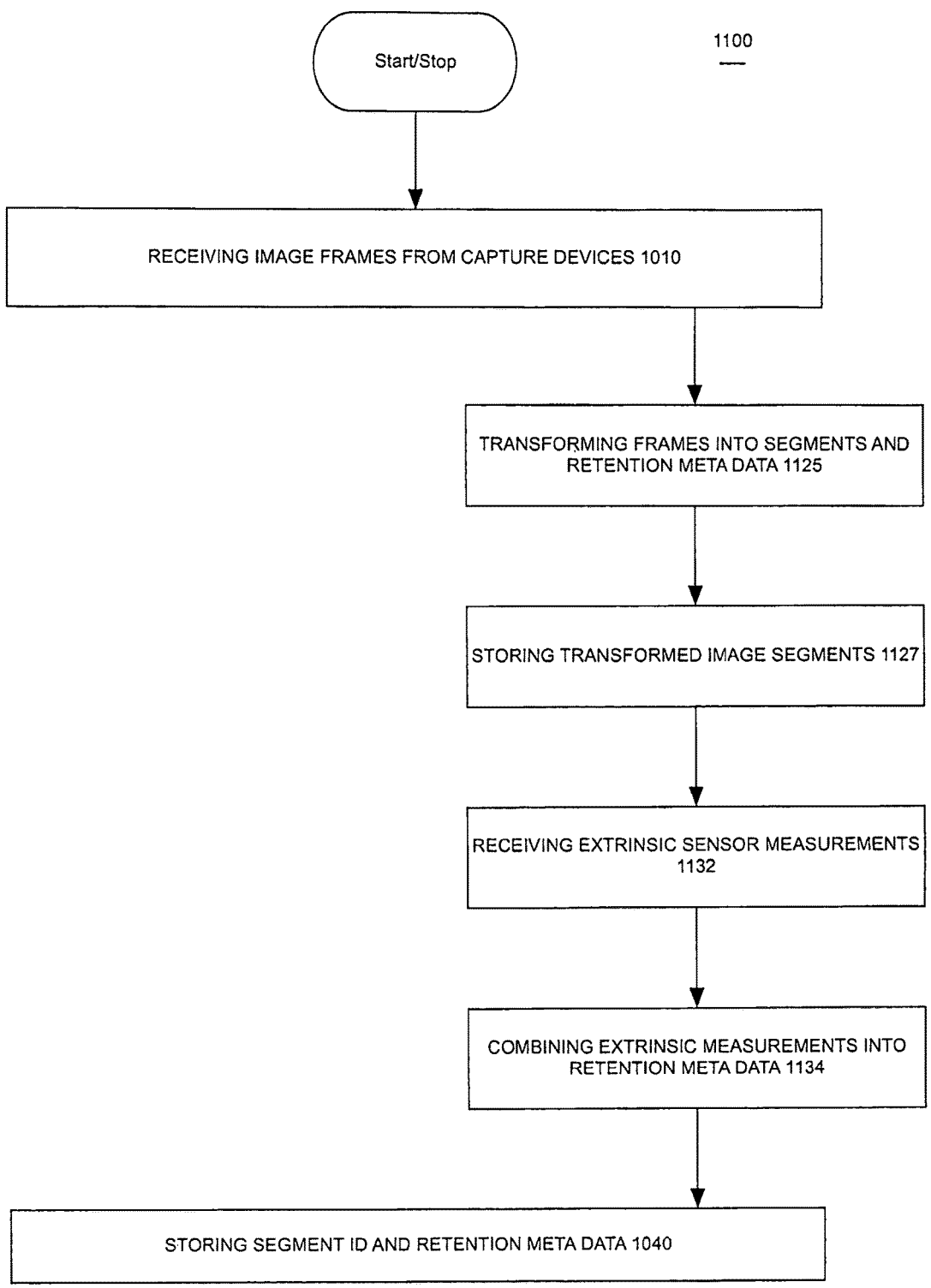

In an other embodiment, illustrated in FIG. 11 the transformation steps include receiving surveillance image frames from capture devices 1010; transforming captured surveillance image frames into image segments and retention meta data arrays 1125; storing transformed image segments into surveillance image store 1127; receiving extrinsic sensor measurements 1132; combining extrinsic sensor measurements into retention meta data arrays 1134; and storing image segment identifiers and retention meta data arrays into a retention meta data store 1040.

The inventive image compression and optimization invention disclosed above also contributes to retention meta data in the following way:

Another process embodiment is a method for compression of a plurality of JPEG codec compatible files (Jframe) in time, spatial, and frequency domains which includes additional steps: reversing Huffman encoding of a first Jframe and storing every frequency coefficient of every block of pixels in to a computer-readable store as a first key frame (Kframe); reversing Huffman encoding of an other Jframe to obtain every frequency coefficient of every block of pixels; transforming the other Jframe into a subsequent frame (subframe) by determining delta frequency coefficients for each block of pixels in the subframe; applying a motion trigger rule to the delta frequency coefficients of each block of pixels separately; on determining a condition that the motion trigger rule passes for each block of pixels, storing all of the delta frequency coefficients of each block, and Huffman encoding the stored delta frequency coefficients of each block; on determining a condition that the motion trigger rule fails for each block of pixels, storing zeros for all the delta frequency coefficients of each block; when the resulting file size meets the target compression goal, storing the file as a subsequent file and storing meta data relating the subsequent file to its related key file, and when the resulting file size exceeds the target compression goal, discarding the delta coefficients and storing the original frequency coefficients of all the blocks as a new key frame.

A motion trigger rule may involve the DC or the lowest frequency range of bins for a block of pixels. Above a threshold, a change from the reference coefficients of the key frame may be stored as a retention meta data and activate a motion trigger rule or deactivate a purging directive.

In an embodiment, a determination of a metric of relative movement between a first image frame and a second image from includes: determining the absolute magnitude of the difference between the coefficients of certain low frequency bins of the key frame and the subsequent frame; summing the absolute magnitude of the differences between the coefficients of certain low frequency bins; and storing the sum into a retention meta data array as a metric of relative movement.

Figure 12:
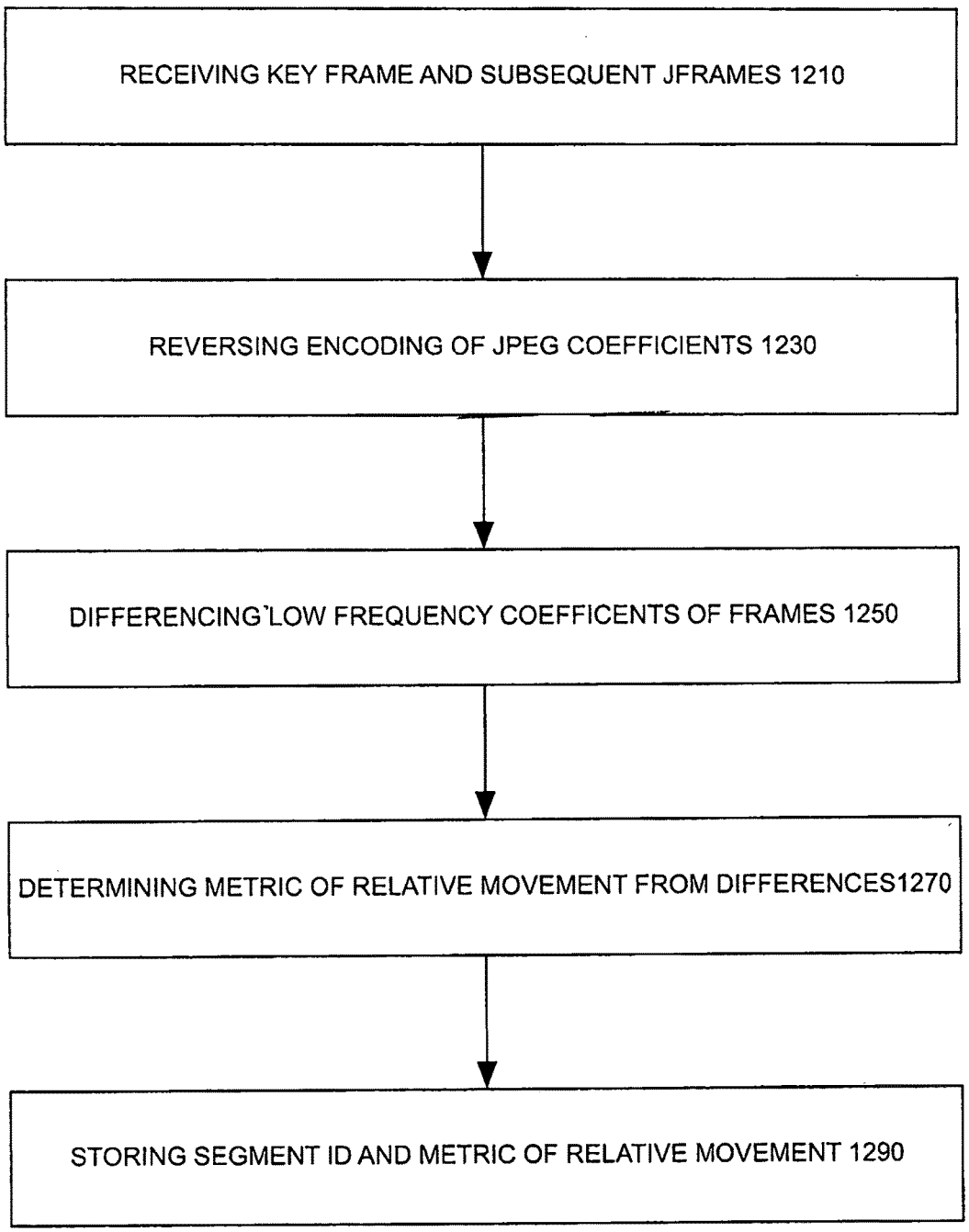

In an embodiment, a method for determining a metric of relative movement is illustrated in FIG. 12. The method 1200 includes the processes: receiving a key JPEG frame (Kframe) and a subsequent frame (Jframe) 1210; reversing Huffman encoding of coefficients of pixel blocks 1230; differencing the low frequency coefficients between corresponding pixel blocks in Kframes and Jframes 1250; determining a metric of relative movement by normalizing the difference of low frequency coefficients 1270; and, storing into retention meta data store an image segment identifier and an associated metric of relative movement 1290.

In an embodiment, a retention meta data array includes an extrinsic sensor measurement correlated to the image segment. In an embodiment, a retention meta data array includes a timestamp of file creation and records of file system operations on the image segment.

In an embodiment, a retention meta data array includes location and ownership of a capture device associated with an image segment.

In an embodiment, extrinsic sensor measurements include sound energy, vibration energy, thermal energy, and state of physical access control portals.

In an embodiment, purging control directives include a threshold of a metric of relative movement within the image segment, a level of extrinsic sensor measurement, and an inequality of at least one of elapsed time since capture, most recent file access, and least recent file access. In an embodiment, purging control directives include ownership, location, and time of capture as specified in judicial orders, legislative statutes, and administrative policies.

Figure 13:
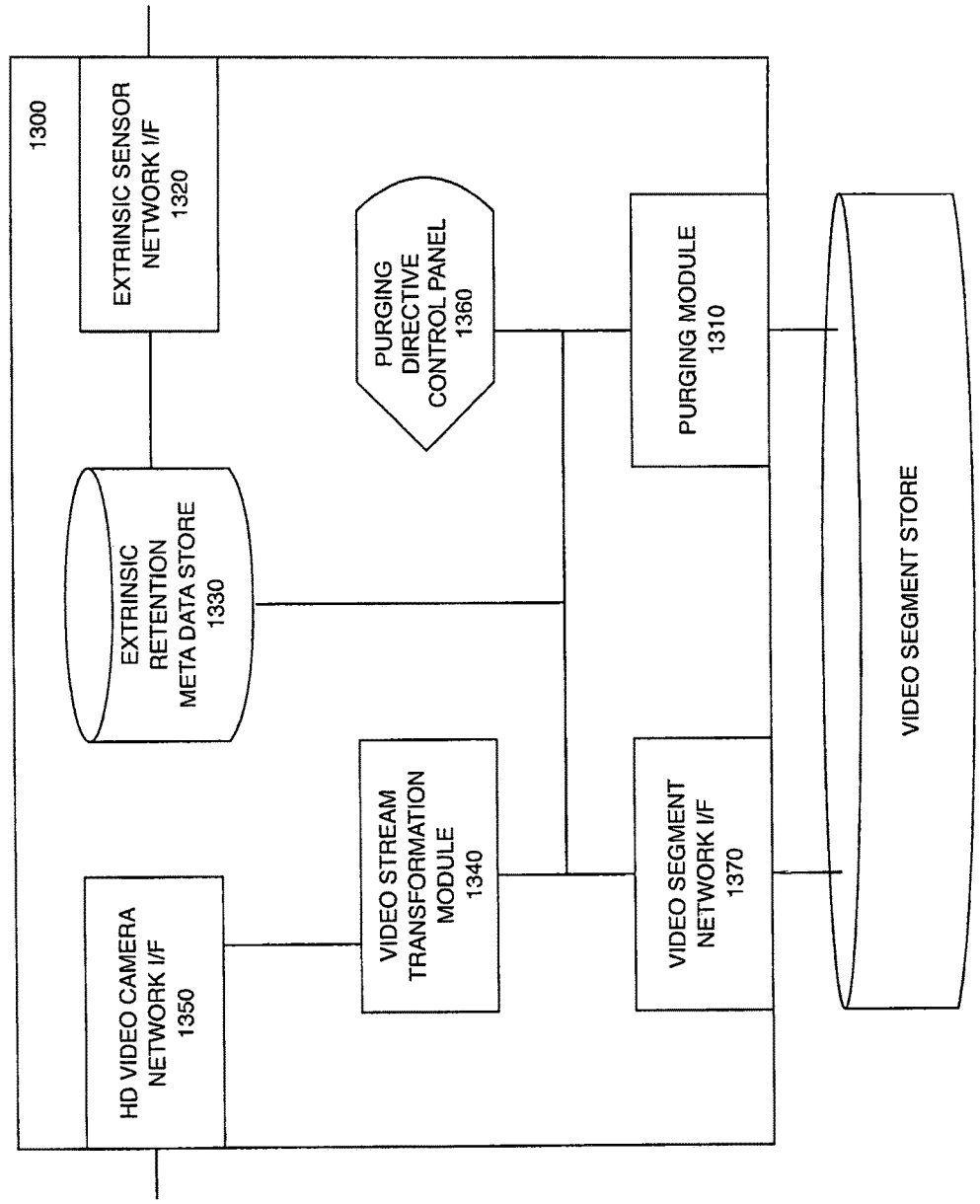
FIG. 13 is a block diagram of an apparatus.

Referring to FIG. 13, another aspect of the invention is an apparatus 1300 including: a purging module 1310; a network interface to extrinsic sensors 1320; an extrinsic retention meta data store 1330; a video stream transformation module 1340; and a network interface to a plurality of high definition video cameras 1350, said modules, interfaces, and interconnected by communication circuits and switches. In an embodiment, the apparatus also includes: a control panel to enter purging directives 1360; and an interface to a non-transitory store of video segment files 1370. In an embodiment, the apparatus also includes: a circuit to receive H.264 streams from high definition video cameras; a circuit to segment H.264 streams into files and embed retention meta data in each header of a file.

In an embodiment, the apparatus also includes: a circuit to determine that an extrinsic sensor measurement or event is of substantial significance to a surveillance system; and, a circuit to set a retention flag in an extrinsic retention meta data store.

In an embodiment, the apparatus also includes: a circuit to decode movement vectors and low frequency coefficients in pixel blocks; and a circuit to set a movement flag into retention meta data of a video segment file. In an embodiment, the apparatus also includes: a circuit to receive a purging directive; and a circuit to remove pointers to video file segment files without a retention flag set.

In an embodiment, said purging module 1310 includes: a retention policy store; a statutory and judicial requirement store; a metric threshold store; a calendar module; a camera and location ownership store; an interface to disk-file management; and a circuit to score retention meta data. In an embodiment, said extrinsic retention meta data store 1330 has, encoded in non-transitory media associated by time with video segments, sensor measurements selected from the groups: portal transits; physical access control requests and actuations; occupancy of rooms, halls, and location space; vibration and movement from accelerometers; temperature and heat; wind speed and humidity; acoustical sound energy; electromagnetic signals from motion, smoke, fire, CO detectors; and perimeter or equipment intrusion alarms.

In an embodiment, said video transformation module 1340 comprises: a circuit to transform H.264 streams into video segments; a circuit to annotate video segments with metrics of acoustic energy transitions; a circuit to annotate video segments with metrics of visible and non-visible spectrum energy transitions; a circuit to transform segments of H.264 video stream into metrics of movement vectors; a circuit to transform segments of H.264 video stream into JPEG pixel blocks; a circuit to transform frequency coefficients to movement metrics; and a circuit to store said metrics into file headers.

Figure 14:
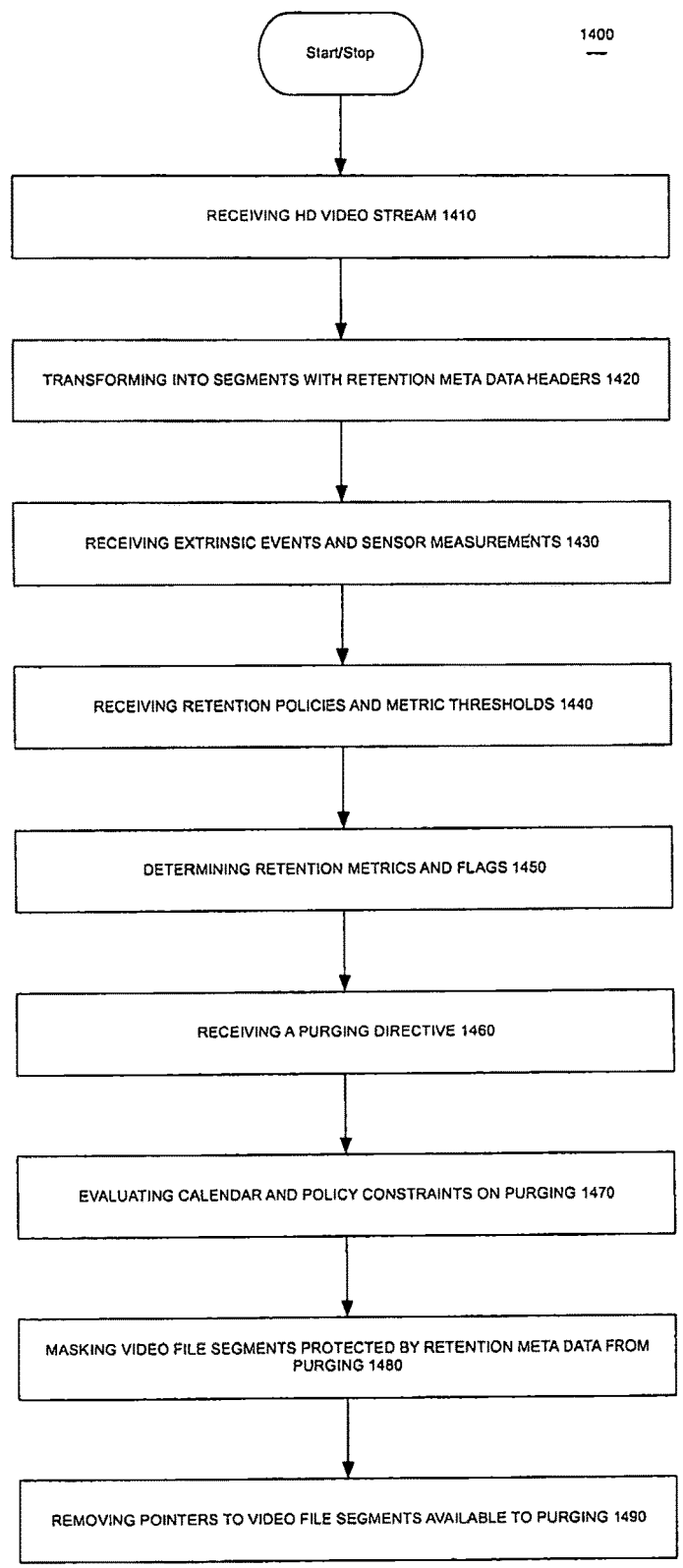
FIG. 14 is a method flow chart.

Referring to FIG. 14, another aspect of the invention is method of operation including: receiving a high definition video stream 1410; transforming the video stream into segments with retention meta data headers 1420; receiving extrinsic events and sensor measurements 1430; receiving retention policies and metric thresholds 1440; determining retention metrics and flags 1450; receiving a purging directive 1460; evaluating calendar and policy constraints on purging 1470; masking video file segments protected by retention meta data from purging 1480; and removing pointers to video file segments available to purging 1490. In an embodiment, receiving a high definition video stream 1410 includes: connecting to a plurality of high definition cameras; downloading video streams in at least one of H.264 and JPEG coding; and reversing coding to obtain movement vectors or frequency bin coefficients. In an embodiment, transforming the video stream into segments with retention meta data headers includes: selecting blocks of time to segment a stream; converting a stream into video segment files; generating a plurality of low resolution preview frames; storing locations of segment files and preview frames; determining motion metrics from contents of segments and previews; and storing retention meta data into tables and file headers.

In an embodiment, receiving extrinsic events and sensor measurements 1430 includes at least one of the group: receiving an indication of portal transit; receiving an indication of area occupancy; receiving a measurement of acoustic energy change; receiving a measurement of vibration and movement; receiving a measurement of radiation energy change; receiving an access control request and actuation; receiving a measurement of temperature or thermal change; receiving a building or equipment intrusion alarm; and receiving a chemical sensor measurement.

In an embodiment, receiving retention policies and metric thresholds 1440 includes at least one of the group: receiving a minimum time from recordation to retain video; receiving a minimum time from most recent use to retain video; receiving a minimum free space to trigger purging; receiving a minimum measure of movement to flag retention; receiving a periodic time to trigger purging; receiving a statutory or judicial requirement for retention; receiving a threshold of a sensor measurement for retention; and receiving an extrinsic event to flag retention.

In an embodiment, determining retention metrics and flags 1450 includes: comparing low frequency coefficients with a threshold; comparing changes in heat, light, sound, and vibration with a threshold; comparing magnitude of motion vectors with a threshold; comparing traffic and occupancy with norms by calendar; and comparing extrinsic events with norms by time and day.

In an embodiment, receiving a purging directive 1460 includes: receiving a command from a user interface; and receiving parameters on thresholds, dates, and locations.

In an embodiment, evaluating calendar and policy constraints on purging 1470 includes: determining that time since recordation has passed a retention threshold; determining that time since last use has passed a retention threshold; determining that percentage of free space has fallen below a threshold; determining that location of the cameras is not within a retention zone; determining that ownership of the cameras is not by a retention client; and determining that there are no judicial or statutory constraints on purging video segments owned by the owner, during that time period, at the location of the camera.

In an embodiment, masking video file segments protected by retention meta data from purging 1480 includes: listing all video file segments older than minimum retention from recordation; removing video file segments recently used within a retention window; comparing retention meta data metrics with thresholds; setting retention flags on video file segments with metrics of significant value; setting retention flags on video file segments which coincide with extrinsic events; extracting retention flags and metrics embedded in file headers; and, setting retention flags on file segments subject to legal requirements, statutes, warrants, court orders, and subpoenas.

In an embodiment, removing pointers to video file segments available to purging 1490 includes: determining when a file segment is protected from purging by legal constraints; determining when a file segment is protected from purging by policy; determining when a file segment is protected from purging by elapsed time from recordation or use; determining when a file segment is protected from purging by an extrinsic retention meta data value or event mark; determining when a file segment is protected from purging by a measure of content above a threshold; and removing a pointer to unprotected video segments from the file system whereby the non-transitory media is returned to free space.

Another aspect of the invention is a method for surveillance image storage optimization having the processes: receiving one or more purging control directives; retrieving a retention meta data array for each of a plurality of image segment identifiers; masking each retrieved retention meta data array by each received purging control directive to set a retention flag for each image segment identifier; purging from surveillance image store, the image segments corresponding to image segment identifiers not set for retention; transforming high definition video into a plurality of image frames; transforming stored image frames into image segments and retention meta data arrays; storing image segment identifiers and retention meta data arrays into a retention meta data store; reversing Huffman encoding of coefficients of pixel blocks; differencing the low frequency coefficients between corresponding pixel blocks in Kframes and Jframes; determining a metric of relative movement by normalizing the difference of low frequency coefficients; and, storing into retention meta data store an image segment identifier and an associated metric of relative movement; wherein a retention meta data array includes an extrinsic sensor measurement correlated to the image segment; wherein a retention meta data array includes a timestamp of file creation and records of file system operations on the image segment; wherein purging control directives include a threshold of a metric of relative movement within the image segment, a level of extrinsic sensor measurement, and an inequality of at least one of elapsed time since capture, most recent file access, and least recent file access; and wherein purging control directives include ownership, location, and time of capture as specified in judicial orders, legislative statutes, and administrative policies.

CONCLUSION

The present invention can be easily distinguished from time or size based conventional file management systems by its recording/storing surveillance images while determining image movement meta data parameters (e.g. low frequency coefficients of JPEG pixel blocks); combining extrinsic records into meta data with image/movement meta data (e.g. sound energy in video recording); setting purging triggers/inhibitors/policies; purging triggers/inhibitors circuit which implements: an administrative record retention policy, statutory regulations, judicial orders; and is triggered by time since most recent use, time since recordation/storage, % of available free space on media, and relative range of purging meta data parameters. An exemplary directive could include: "Purge image segments below thresholds of meta data older than _____ upon _____"

Content and extrinsic meta data parameters include: movement range, low frequency bins of pixel blocks, rate of change in low frequency coefficients, and out of norm for time of day/day of week.

Retention control by access control events include door opening, window opening, and traffic/volume measurements. Retention control by environmental sensors include sound energy at microphones, thermal energy at sensors, vibration energy at accelerometers, heart rate/blood pressure/chemistry, and heating/ac/light switches.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a high definition video surveillance storage optimization apparatus comprises:
   receiving a high definition video stream;
   transforming the video stream into segments with retention meta data headers;
   receiving extrinsic events and sensor measurements;
   receiving retention policies and metric thresholds;
   determining retention metrics and flags;
   receiving a purging directive;
   evaluating calendar and policy constraints on purging;
   masking video file segments protected by retention meta data from purging; and removing pointers to video file segments available to purging.

2. The method of claim 1 wherein receiving a high definition video stream comprises:
connecting to a plurality of high definition cameras;
downloading video streams in at least one of H.264 and JPEG coding;
reversing coding to obtain at least one of movement vectors and frequency bin coefficients; and
determining a metric of motion.

3. The method of claim 1 wherein transforming the video stream into segments with retention meta data headers comprises:
selecting blocks of time to segment a stream;
converting a stream into video segment files;
generating a plurality of low resolution preview frames;
storing locations of segment files and preview frames;
determining motion metrics from contents of segments and previews; and
storing retention meta data into tables and file headers.

4. The method of claim 1 wherein receiving extrinsic events and sensor measurements comprises at least one of the group:
receiving an indication of portal transit;
receiving an indication of area occupancy;
receiving a measurement of acoustic energy change;
receiving a measurement of vibration and movement;
receiving a measurement of radiation energy change;
receiving an access control request and actuation;
receiving a measurement of temperature or thermal change;
receiving an intrusion alarm; and
receiving a chemical sensor measurement, wherein said intrusion alarm denotes at least one of the group a building intrusion and an equipment intrusion.

5. The method of claim 1 wherein receiving retention policies and metric thresholds comprises:
receiving a minimum time from recordation to retain video;
receiving a minimum time from most recent use to retain video;
receiving a minimum free space to trigger purging;
receiving a minimum measure of movement to flag retention; receiving a periodic time to trigger purging;
receiving a statutory or judicial requirement for retention;
receiving a threshold of a sensor measurement for retention; and
receiving an extrinsic event to flag retention.

6. The method of claim 1 wherein determining retention metrics and flags comprises:
comparing low frequency coefficients with a threshold;
comparing changes in heat, light, sound, and vibration with a threshold;
comparing magnitude of motion vectors with a threshold;
comparing traffic and occupancy with norms by calendar; and
comparing extrinsic events with norms by time and day.

7. The method of claim 1 wherein receiving a purging directive comprises:
receiving a command from a user interface; and
receiving parameters on thresholds, dates, and locations.

8. The method of claim 1 wherein evaluating calendar and policy constraints on purging comprises:
determining that time since recordation has passed a retention threshold;
determining that time since last use has passed a retention threshold;
determining that percentage of free space has fallen below a threshold; determining that location of the cameras is not within a retention zone;
determining that ownership of the cameras is not by a retention client; and
determining that there are no judicial or statutory constraints on purging video segments owned by the owner, during that time period, at the location of the camera.

9. The method of claim 1 wherein masking video file segments protected by retention meta data from purging comprises:
listing all video file segments older than minimum retention from recordation;
removing video file segments recently used within a retention window;
comparing retention meta data metrics with thresholds;
setting retention flags on video file segments with metrics of significant value;
setting retention flags on video file segments which coincide with extrinsic events;
extracting retention flags and metrics embedded in file headers; and,
setting retention flags on file segments subject to legal requirements, statutes, warrants, court orders, and subpoenas.

10. The method of claim 1 wherein removing pointers to video file segments available to purging comprises:
determining when a file segment is protected from purging by legal constraints;
determining when a file segment is protected from purging by policy;
determining when a file segment is protected from purging by elapsed time from recordation or use;
determining when a file segment is protected from purging by an extrinsic retention meta data value or event mark;
determining when a file segment is protected from purging by a measure of content above a threshold; and
removing a pointer to unprotected video segments from the file system whereby the non-transitory media is returned to free space.

11. A method for surveillance image storage optimization comprising:
receiving one or more purging control directives; retrieving a retention meta data array for each of a plurality of image segment identifiers;
masking each retrieved retention meta data array by each received purging control directive to set a retention flag for each image segment identifier;
purging from surveillance image store, the image segments corresponding to image segment identifiers not set for retention;
transforming high definition video into a plurality of image frames;
transforming stored image frames into image segments and retention meta data arrays;
storing image segment identifiers and retention meta data arrays into a retention meta data store;
reversing Huffman encoding of coefficients of pixel blocks;
differencing the low frequency coefficients between corresponding pixel blocks in Kframes and Jframes;
determining a metric of relative movement by normalizing the difference of low frequency coefficients; and,
storing into retention meta data store an image segment identifier and an associated metric of relative movement; wherein a retention meta data array includes an extrinsic sensor measurement correlated to the image segment; wherein a retention meta data array includes a timestamp of file creation and records of file system operations on the image segment; wherein purging control directives include a threshold of a metric of relative movement within the image segment, a level of extrinsic sensor measurement, and an inequality of at least one of elapsed time since capture, most recent file access, and least recent file access; wherein purging control directives include ownership, location, and time of capture as specified in judicial orders, legislative statutes, and administrative policies.

* * * * *